US006716495B1

(12) United States Patent
Yoshino et al.

(10) Patent No.: US 6,716,495 B1

(45) Date of Patent: Apr. 6, 2004

(54) INK-JET RECORDING APPARATUS AND RECORDING MEDIUM

(75) Inventors: Hitoshi Yoshino, Kanagawa (JP); Noribumi Koitabashi, Kanagawa (JP); Katsumi Aoki, Kanagawa (JP); Hiroyuki Ogino, Kanagawa (JP); Yasunori Fujimoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 28 days.

(21) Appl. No.: 09/987,298

(22) Filed: Nov. 14, 2001

(30) Foreign Application Priority Data

Nov. 17, 2000 (JP) ....................................... 2000-351666
Nov. 17, 2000 (JP) ....................................... 2000-352006

(51) Int. Cl.$^7$ .................................................. B32B 3/00

(52) U.S. Cl. ................................ 428/32.16; 428/32.21; 428/32.31; 428/32.34; 162/135; 162/141; 162/149; 162/164.6; 162/181.4

(58) Field of Search ........................... 428/32.16, 32.31, 428/32.34, 32.21; 162/135, 141, 149, 164.6, 181.4

(56) References Cited

U.S. PATENT DOCUMENTS 4,269,891 A 5/1981 Minagawa .................. 428/335
4,425,405 A * 1/1984 Murakami et al. .......... 428/342

(List continued on next page.)

FOREIGN PATENT DOCUMENTS

| | | |
|---|---|---|
| EP | 0 701 904 A1 | 3/1996 |
| EP | 0 736 392 A1 | 10/1996 |
| EP | 0 917 961 A2 | 5/1999 |
| EP | 0 967 088 A2 | 12/1999 |
| EP | 1 002 656 A2 | 5/2000 |
| JP | 51-38298 A | 3/1976 |
| JP | 53-49113 A | 5/1978 |
| JP | 54-59936 A | 5/1979 |

(List continued on next page.)

OTHER PUBLICATIONS

Josef Rocek et al., "Porous Structure of Aluminium Hydroxide and Its Content of Pseudoboehmite", Applied Catalysis, 74 (1991) pp. 29–36.

*Primary Examiner*—Cynthia H. Kelly
*Assistant Examiner*—B. Shewareged
(74) *Attorney, Agent, or Firm*—Fitzpatrick, Cella, Harper & Scinto

(57) ABSTRACT

An ink-jet recording apparatus is adapted to eject ink from an ink-jet head onto a recording medium held in position by means of an electrostatic adsorption system. The surface resistance of the recording medium is not greater than $1\times10^{11}$ Ω/□.

6 Claims, 8 Drawing Sheets

U.S. PATENT DOCUMENTS

| | | | | | |
|---|---|---|---|---|---|
| 4,433,048 | A | | 2/1984 | Solberg et al. | 430/434 |
| 4,442,172 | A | | 4/1984 | Oshima et al. | 428/342 |
| 4,723,129 | A | | 2/1988 | Endo et al. | 346/1.1 |
| 4,734,336 | A | | 3/1988 | Oliver et al. | 428/537.5 |
| 4,740,420 | A | | 4/1988 | Akutsu et al. | 428/341 |
| 5,032,225 | A | | 7/1991 | Saji et al. | 162/135 |
| 5,180,624 | A | | 1/1993 | Kojima et al. | 428/211 |
| 5,266,383 | A | | 11/1993 | Sakaki et al. | 428/195 |
| 5,270,103 | A | * | 12/1993 | Oliver et al. | 428/219 |
| 5,496,626 | A | | 3/1996 | Hamajima et al. | 428/284 |
| 5,635,291 | A | | 6/1997 | Yoshino et al. | 428/304.4 |
| 5,679,451 | A | | 10/1997 | Kondo et al. | 428/304.4 |
| 5,707,716 | A | | 1/1998 | Yoshino et al. | 428/212 |
| 5,738,932 | A | | 4/1998 | Kondo et al. | 428/195 |
| 5,804,320 | A | | 9/1998 | Tomioka et al. | 428/478.2 |
| 5,846,647 | A | | 12/1998 | Yoshino et al. | 428/328 |
| 5,849,447 | A | | 12/1998 | Matsuda | 430/97 |
| 5,888,367 | A | * | 3/1999 | Mouri et al. | 204/483 |
| 5,955,185 | A | | 9/1999 | Yoshino et al. | 428/304.4 |
| 5,965,252 | A | | 10/1999 | Santo et al. | 428/329 |
| 6,000,794 | A | | 12/1999 | Kondo et al. | 347/105 |
| 6,013,359 | A | * | 1/2000 | Takano et al. | 428/219 |
| 6,045,904 | A | * | 4/2000 | Torikoshi et al. | 428/334 |
| 6,048,606 | A | | 4/2000 | Bourdelais et al. | 428/304.4 |
| 6,177,188 | B1 | | 1/2001 | Ichioka et al. | 428/342 |
| 6,214,458 | B1 | * | 4/2001 | Kobayashi et al. | 428/332 |
| 6,423,182 | B1 | * | 7/2002 | Furunaga et al. | 162/135 |

FOREIGN PATENT DOCUMENTS

| | | | | | |
|---|---|---|---|---|---|
| JP | 55-5830 | A | | 1/1980 | |
| JP | 54-51583 | A | | 4/1980 | |
| JP | 56-120508 | A | | 9/1981 | |
| JP | 58-8685 | A | | 1/1983 | |
| JP | 63-118287 | A | | 5/1988 | |
| JP | 64-78877 | A | | 3/1989 | |
| JP | 1-141783 | A | | 6/1989 | |
| JP | 2-243381 | A | | 9/1990 | |
| JP | 2-243382 | A | | 9/1990 | |
| JP | 4-202011 | A | | 7/1992 | |
| JP | 5-16015 | A | | 3/1993 | |
| JP | 5-106197 | A | | 4/1993 | |
| JP | 6-219043 | A | | 8/1994 | |
| JP | 6-287886 | A | | 10/1994 | |
| JP | 6-312572 | A | | 11/1994 | |
| JP | 7-25131 | A | | 1/1995 | |
| JP | 7-25132 | A | | 1/1995 | |
| JP | 8-132731 | A | | 5/1996 | |
| JP | 8-174993 | | | 7/1996 | |
| JP | 8-258400 | A | | 10/1996 | |
| JP | 9-76628 | A | | 3/1997 | |
| JP | 9-86035 | A | | 3/1997 | |
| JP | 9-99627 | A | | 4/1997 | |
| JP | 9-170190 | A | | 6/1997 | |
| JP | 2714350 | B2 | | 2/1998 | |
| JP | 2714351 | B2 | | 2/1998 | |
| JP | 2714352 | B2 | | 2/1998 | |
| JP | 10-204367 | A | | 8/1998 | |
| JP | 11-174718 | A | | 7/1999 | |
| JP | 2000-79755 | A | | 3/2000 | |
| JP | 2000-211250 | A | | 8/2000 | |
| JP | 2001-226898 | | * | 8/2001 | D21H/21/16 |

* cited by examiner

INK-JET RECORDING APPARATUS AND RECORDING MEDIUM

BACKGROUND OF THE INVENTION

1. Field of the Invention

This invention relates to an ink-jet recording apparatus and a recording medium to be used with such an ink-jet recording apparatus. More particularly, the present invention relates to an ink-jet recording apparatus employing an electrostatic adsorption method for moving a recording medium.

2. Related Background Art

An ink-jet recording system adapted to eject fine ink droplets and causing them to adhere to a recording medium such as a sheet of paper for the purpose of recording images and/or characters provides a number of advantages including high speed and low noise operation, adaptability to multi-color recording, versatile recording patterns and non-use of both developing unit and fixing unit. It can be driven to eject fine ink droplets on any of a number of different operating principles. Because of the remarkable advantages, ink-jet recording systems have been used with increasing popularity in various applications including information devices for outputting/recording visual information. Additionally, images formed by a multi-color ink-jet recording system are comparable to those obtained by color printing using a plate or color photography in terms of image quality. Furthermore, the multi-color ink-jet recording system can produce images at low cost if compared with color gravure printing and photography particularly when the number of copies to be produced is small. Therefore, the ink-jet recording system is expanding its scope of application rapidly to cover full-color recording.

Of various known ink-jet recording systems, the recording system using a so-called full multi-head having a width comparable to the recording medium has been known to be advantageous for high speed recording. There has been proposed the use of an electrostatic adsorption belt for moving the recording medium for recording apparatus employing the ink-jet recording system. Ink droplets are ejected from the recording head onto the recording medium that is being adsorbed to the electrostatic adsorption belt and moved with the latter.

However, known electrostatic adsorption systems for moving a recording medium is accompanied by a number of problems. The recording medium has to be held flat while it is being moved and then quickly discharged from the electrostatic adsorption belt so as to be delivered to the outside of the system. However, ink mist can be produced and adhere to the surface of the recording medium when the ink is ejected from the recording head under the influence of the surface potential of the electrostatically adsorbed recording medium. Additionally, some of the ejected ink droplets can be deflected from the proper course also by the surface potential of the electrostatically adsorbed recording medium to consequently adversely affect the quality of the image formed on the recording medium.

The inventors of the present invention have been paying research efforts for dissolving the technological problems relating to the electrostatic adsorption system to which the physical, chemical and/or electrostatic properties of the recording medium may be responsible. To date, the properties of a recording medium have been studied and improved mostly from the viewpoint of the quality of the recorded image and the ink absorbability.

For instance, the recording medium is required to show enhanced properties in response to the improvements in the recording performance of the ink-jet recording system including high speed recording, high definition recording and full color recording. In an attempt at meeting the requirements for improving the properties, various forms of recording medium have been proposed to date. Some of them will be briefly examined below.

Japanese Patent Application Laid-Open No. 55-5830 proposes an ink-jet recording sheet comprising an ink absorbing coated layer on the surface of the support sheet thereof. Japanese Patent Application Laid-Open No. 55-51583 proposes an ink-jet recording sheet comprising a coated layer containing amorphous silica as pigment.

Any of the heretofore proposed ink-jet recording sheets is realized by forming an ink-receiving layer containing a pigment such as alumina or silica on a base sheet. Because of the arrangement of the ink-receiving layer, the proposed ink-jet recording sheets do not provide the handle of plain paper if they comprise a paper base member. Japanese Patent Application Laid-Open Nos. 6-312572, 7-25131 and 7-25132 propose a recording medium comprising a base paper that is slightly coated with ultra-fine pigment particles to a covering ratio of not less than 70% and having a recording surface that provides a surface profile of pulp fibers in order to give a touch of plain paper to the recording medium. Additionally, Japanese Patent Application Laid-Open No. 1-141783 proposes an ink-jet recording paper obtained by on-machine coating of amorphous silica and alumina hydrate and Japanese Patent Application Laid-Open No. 11-174718 proposes information recording paper coated with pigment size.

On the other hand, recording mediums prepared by internally adding one or more than one loading materials to paper have also been proposed. For instance, Japanese Patent Application Laid-Open No. 53-49113 proposes recording paper comprising a sheet containing internally added urea formalin resin powder and coated and impregnated with a water-soluble polymer. Japanese Patent Application Laid-open No. 58-8685 proposes recording paper comprising a sheet containing a synthetic silicate and glass fibers that are internally added and coated and impregnated with a water-soluble polymer. These inventions are intended to improve the ink absorbability of the recording medium by internally adding fine particles of one or more than one specific substances to unsized paper.

Recording paper having a multilayer structure is also proposed as a different form of paper containing one or more than one internally added substances. For example, Japanese Patent Application Laid-open No. 63-118287 and U.S. Pat. No. 4,734,336 propose uncoated paper prepared by bonding a support layer made of pulp fibers and a surface layer made of one or more than one loading materials such as silica and fibers. Japanese Patent Application Laid-open Nos. 1-78877, 2-243381, 2-243382 and 5-106197 propose multilayer recording paper whose layers are formed simultaneously and in which the base layer or the interface of the base layer and the surface layer is sized. Japanese Patent Application Laid-open No. 6-219043 proposes multilayer recording paper whose surface layer carries an inorganic substance that is hardly soluble or insoluble to water. Japanese Patent Application Laid-open Nos. 6-287886, and 8-258400 propose multilayer recording paper made by using a specific type of pulp such as bulky cellulose, mercerized pulp or bleached broad leaf sulfite pulp. Japanese Patent Application Laid-open No. 9-170190 proposes multilayer recording paper having a surface layer mainly made of hydrophilic or hydrophobic fibers and a base layer mainly made of cellulose fibers.

Thus, it has been realized that the recording medium is an important factor for improving the quality of recorded image and the speed of recording images and efforts have been paid almost exclusively to meet the requirements for improving the properties and hence the recording performance of recording medium. However, with any of the above listed techniques, it is difficult to realize a recording medium that meets the requirements for improving the recording performance and also dissolves the technological problems relating to the electrostatic adsorption system and an ink-jet recording apparatus adapted to use such a recording medium.

SUMMARY OF THE INVENTION

In view of the above identified problems, it is therefore the object of the present invention to provide an ink-jet recording apparatus adapted to adsorb and move the recording medium by means of an electrostatic adsorption system that can minimize the influence of the surface potential of the recording medium on the recorded image and at the same time meet the requirements relating to the recording performance and also a recording medium that can suitably be used with such an ink-jet recording apparatus.

According to the invention, the above object is achieved by providing an ink-jet recording apparatus adapted to eject ink from an ink-jet head onto a recording medium held in position by means of an electrostatic adsorption system, the surface resistance of the recording medium being not greater than $1\times10^{11}$ Ω/□.

In another aspect of the present invention, there is provided a recording medium to be used for an ink-jet recording apparatus adapted to eject ink from an ink-jet head onto the recording medium held in position by means of an electrostatic adsorption system, the surface resistance of the recording medium being not greater than $1\times10^{11}$ Ω/□.

Thus, as the surface resistance of a recording medium according to the invention is held to be not greater than $1\times10^{11}$ Ω/□, the surface potential of the recording medium that is produced by electrostatic adsorption as a result of being moved by means of an electrostatic adsorption system is quickly reduced to 0V. Therefore, the problem of the electric field that is generated by the surface potential to deflect the ejected ink droplets and that of ink mist that can adhere to the recording medium can be effectively prevented from occurring.

DESCRIPTION OF THE PREFERRED EMBODIMENTS

Now, the present invention will be described in greater detail by referring to the accompanying drawings that illustrate preferred embodiments of the invention.

Firstly, an embodiment of ink-jet recording apparatus (to be referred to simply as recording apparatus hereinafter) adapted to move a sheet of recording paper, or a recording medium, by means of an electrostatic adsorption belt will be described by referring to FIGS. 1 through 7 particularly in terms of the entire configuration and the electrostatic adsorption system thereof.

Figure 1:
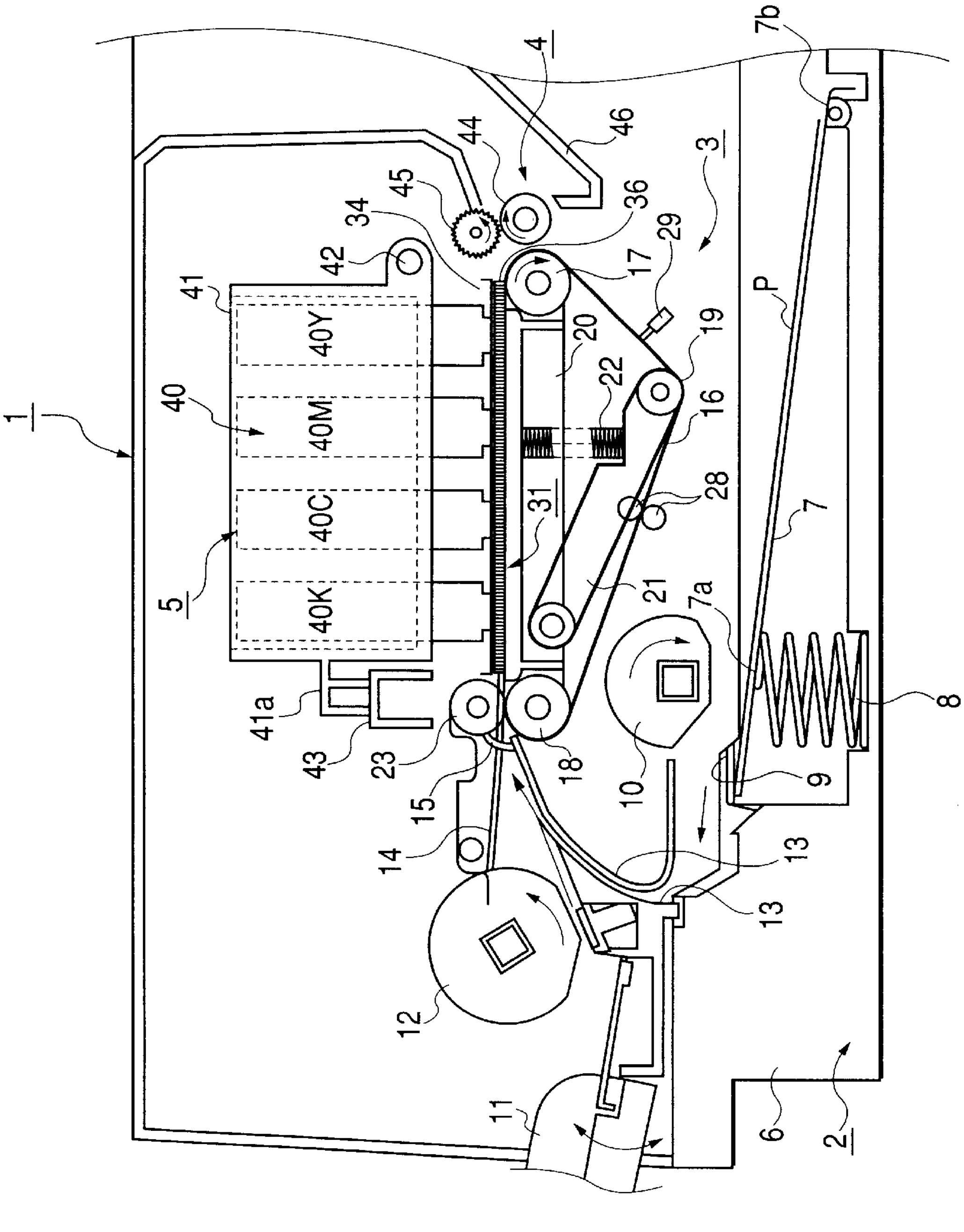
FIG. 1 is a schematic cross sectional view of an embodiment of ink-jet recording apparatus according to the invention, illustrating the overall configuration thereof.

As shown in FIG. 1, the embodiment of recording apparatus 1 has an automatic feeding system comprising a feeding section 2, a conveyance section 3, a recording section 5 and a delivery section 4.

(Feeding Section)

The feeding section 2 includes a plate 7 for carrying sheets of recording paper P, or recording mediums, thereon and a feed roller 10 for feeding a recording paper P at a time, the plate 7 and the feed roller 10 being secured to a base 6. The plate 7 can be rotated around a rotary shaft **7*b* linked to the base 6 and is urged toward the feed roller 10 by a plate urging spring 8. The plate 7 is provided at a position facing the feed roller 10 with a splitting pat 7*a*** made of a material showing a large coefficient of friction such as artificial leather to prevent two or more than two sheets of recording paper from adhering to each other and being moved simultaneously.

Additionally, splitting claw 9 that covers a front corner of the sheets of recording paper P and separates the sheet to be fed and a release cum (not shown) for releasing the plate 7 and the feed roller 10 for mutual contact.

With the above arrangement, the release cum pushes down the plate 7 to a predetermined position for the standby state to release the plate 7 and the feed roller 10 from mutual contact. As the drive force of the conveyor roller 18 is transmitted to the feed roller 10 and the release cum by way of gears, the release cum releases the plate 7 to allow the latter to rise and cause the sheet of recording paper P to abut the feed roller 10. Then, as the feed roller 10 rotates, the sheet of recording paper P is picked up and separated from the following sheets by the splitting claw 9 and moved to the conveyance section 3. The feed roller 10 keeps on rotating until the sheet of recording paper P is completely moved into the conveyance section 3. Then, the remaining sheets of recording paper P are separated from the feed roller 10 and held in the standby state as the drive force from the conveyor roller 18 is interrupted.

A hand feed tray 11 is arranged near the recording apparatus 1. The hand feed tray 11 carries sheets of recording paper P, one of which is fed to the conveyance section 3 at a time according to a recording instruction signal from a computer by means of a hand feed roller 12 as it is guided by a lower guide 13 and an upper guide 14.

(Conveyance Section)

The conveyance section 3 comprises a conveyor belt 16 for holding a sheet of recording paper P by adsorption and transferring it and a sheet edge sensor (not shown). The conveyor belt 16 is wound around a drive roller 17 that is a downstream conveyor roller, a conveyor roller 18 that is arranged upstream and a pressure roller 19. The drive roller 17 is fed with drive force from a drive motor 27 which will be described in greater detail hereinafter to drive the conveyor belt 16 to rotate.

Note that the drive roller 17 and the conveyor roller 18 are rotatably fitted to a platen 20 while the pressure roller 19 is rotatably fitted to an end of an arm 21 whose other end is swingably fitted to the platen 20. The conveyor belt 16 is held at tension as the arm 21 is urged downward by a spring 22. The platen 20 is located below the conveyor belt 16 to support the latter.

A pinch roller 23 is arranged vis-a-vis the conveyor roller 18 so as to contact and follow the movement of the conveyor roller 18. As the pinch roller 23 is pressed against the conveyor belt 16 by a spring (not shown), the sheet of recording paper P is pinched between them and moved to the recording section. The upper guide 14 for guiding the sheet of recording paper P from the feeding section 2 is provided with a sensor lever 15 for detecting the front and rear edges of the sheet of recording paper P and transmits corresponding signals to the sheet edge sensor. With this arrangement, the recording position of the sheet of recording paper P can be accurately detected.

The recording head 40 of the recording section 5 for forming an image according to the image signal given to it is arranged downstream relative to the conveyor roller 18 in the sense of moving the sheet of recording paper P.

(Recording Section)

The recording section 5 of this embodiment comprises a full-line type ink-jet recording head 40 having a plurality of nozzles arranged in a direction perpendicular to the moving direction of the sheet of recording paper P and extending along the entire width of the latter. The recording head 40 has head units 40K (black), 40C (cyan), 40M (magenta) and 40Y (yellow) arranged at regular intervals in the mentioned order as viewed from the upstream of the moving direction of the sheet of recording paper P and fitted to a head holder 41. The recording head 40 is provided with electro-thermal transducers such as electric heaters adapted to apply heat to liquid ink 52 of different colors respectively and give rise to film boiling in the ink 52 so that ink 52 is ejected from the nozzles of the recording head 40 and form an image on the sheet of recording paper P due to the pressure change caused by the film boiling and the resulting expansion or contraction of air bubbles.

The head holder 41 is rotatably secured at an end thereof to a shaft 42 and has a projection 41*a* formed at the other end that is engaged with a rail 43 to define the distance between the front ends of the nozzles of the recording head 40 and the sheet of recording paper P.

(Delivery Section)

The delivery section 4 comprises a delivery roller 44 and a rowel 45. The sheet of recording paper P on which an image is formed in the recording section is pinched and moved by the delivery roller 44 and the rowel 45 and delivered to a delivery tray 46.

Now, the arrangement and the operation for moving a sheet of recording paper P by adsorption in the recording section and the configuration of the adsorptive power generating mechanism will be described by referring to FIGS. 1 through 6. Firstly, the arrangement for moving a sheet of recording paper P by adsorption will be discussed by referring to FIGS. 1 and 2.

Figure 2:
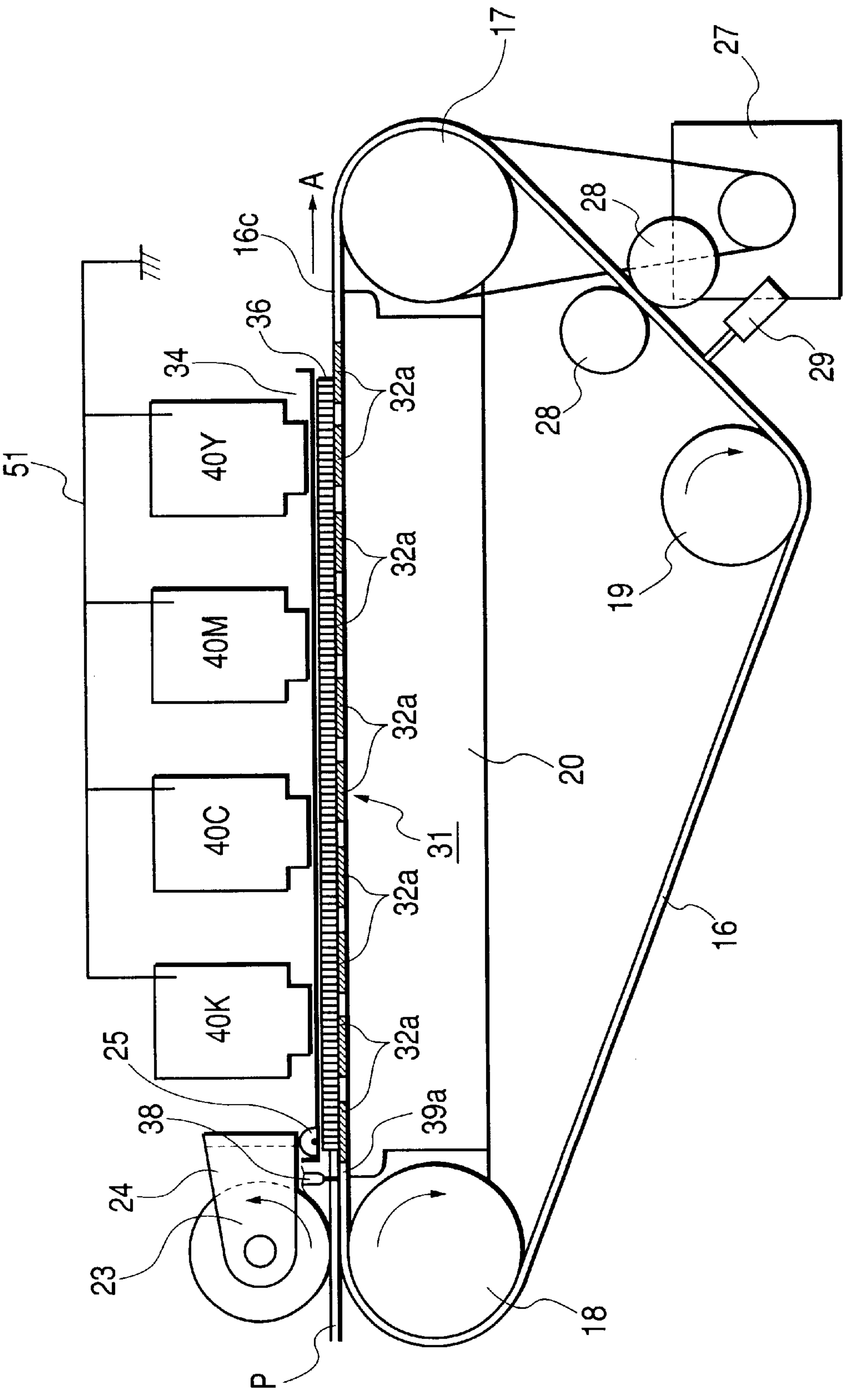
FIG. 2 is an enlarged schematic cross sectional view of the conveyance section of the embodiment of FIG. 1.

Referring to FIGS. 1 and 2, the conveyor belt 16 is an endless belt made of synthetic resin such as polyethylene or polycarbonate and has a thickness of about 0.1 to 0.2 mm. The conveyor belt 16 is provided with an adsorptive power generating mechanism, which will be described in greater detail hereinafter, so that adsorptive power is given to the conveyor belt 16 in the recording zone located below the recording head 40 as a voltage of about 0.5 to 10 KV is applied to the power feeding member 34 held in contact with the conveyor belt 16.

The conveyor belt 16 is held at appropriate tension by the drive roller 17, the conveyor roller 18 and the pressure roller 19, of which the drive roller 17 is linked to the drive motor 27. A sheet press member 25 is arranged to turn around the rotary shaft of the pinch roller 23 and operate as press mechanism for pressing the sheet of recording paper P against the conveyor belt 16 because it is urged toward the conveyor belt by an urging means (not shown).

Additionally, a pair of cleaning rollers 28 are arranged to pinch the conveyor belt 16. The paired cleaning rollers 28 are made of a spongy material having continuously arranged small pores (preferably having a diameter between 10 and 30 $\mu$m) in order to absorb ink 52 and other foreign matters adhering to the conveyor belt 16 and make themselves highly durable. Thus, the conveyor belt 16 is cleaned by the paired cleaning rollers 28 and subsequently deelectrified by a deelectrifying brush 29.

Now, the adsorptive power generating mechanism 31 will be discussed by referring to FIGS. 3 through 5.

Figure 3:
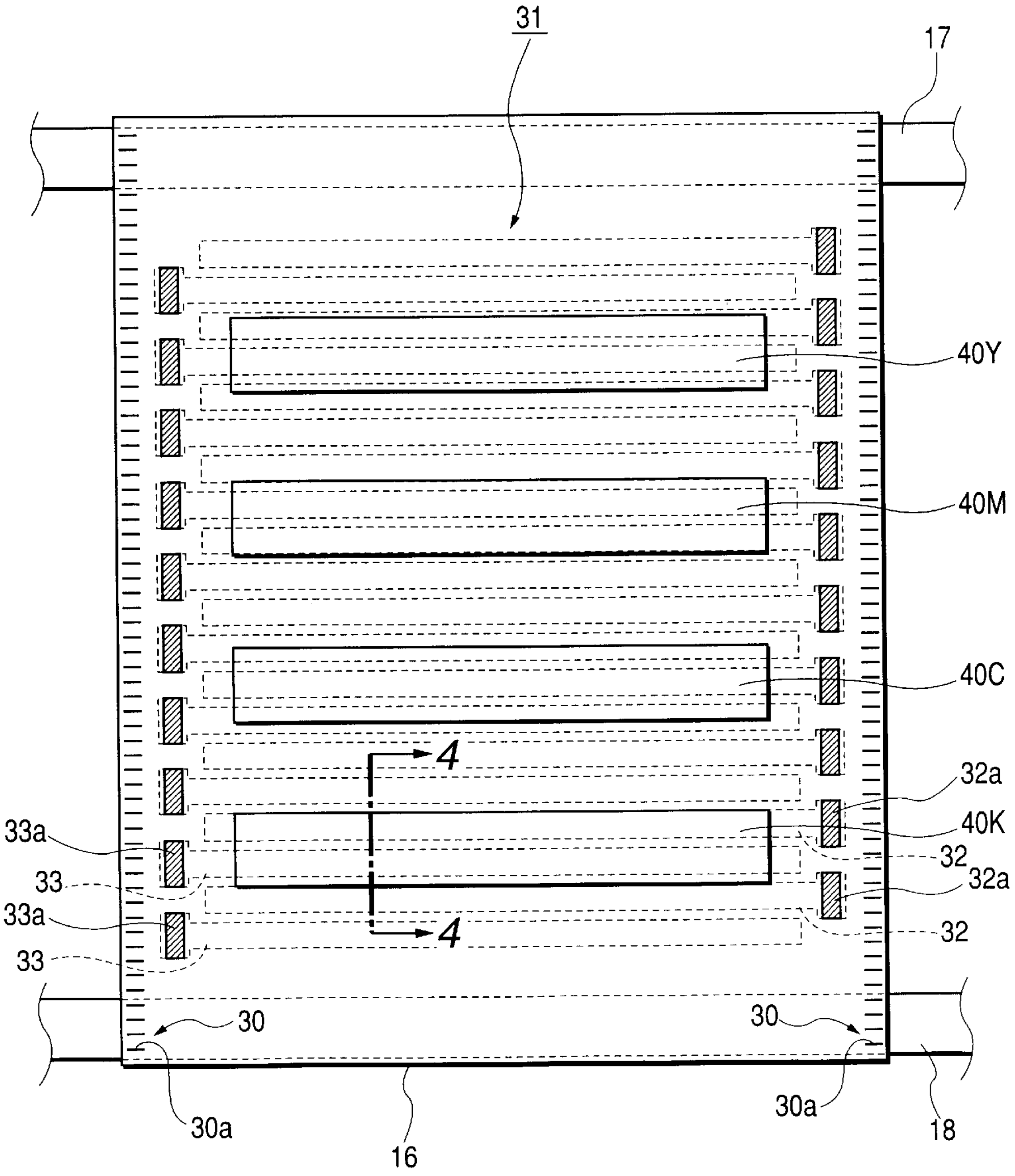
FIG. 3 is a schematic plan view of the conveyor belt of the conveyance section of the embodiment of FIG. 1.

As shown in FIG. 3, the.adsorptive power generating mechanism 31 comprises pairs of electrode plates 32, 33 made of an electrically conductive metal and arranged inside the conveyor belt 16. As a whole, the electrode plates 32, 33 have a comb-shaped profile with the individual teeth, or the electrode plates 32, 33, arranged in rows perpendicular to the moving direction of the conveyor belt 16. The electrode plates 32, 33 are separated from each other and their teeth are arranged interdigitally on the inner surface of the conveyor belt 16 as seen from FIG. 3.

Each of the electrode plates 32 and each of the electrode plates 33 are provided with respective power feeding sections 32*a*, 33*a* (produced by exposing the pattern of the electrodes). The power feeding sections 32*a*, 33*a* have a length greater then width of the individual electrode plates 32, 33 and held in contact with the respective power feeding brushes 36, 37 of the power feeding member 34 under a predetermined level of pressure as shown in FIG. 5. A positive voltage is applied by a positive/negative power source 50 which is a high voltage power source to the power feeding brush 36 connected to the power feeding section 32*a* of each electrode plate 32, whereas a negative voltage is applied by the power source 50 to the power feeding brush 37 connected to the power feeding section 33*a* of each electrode plate 33.

Figure 5:
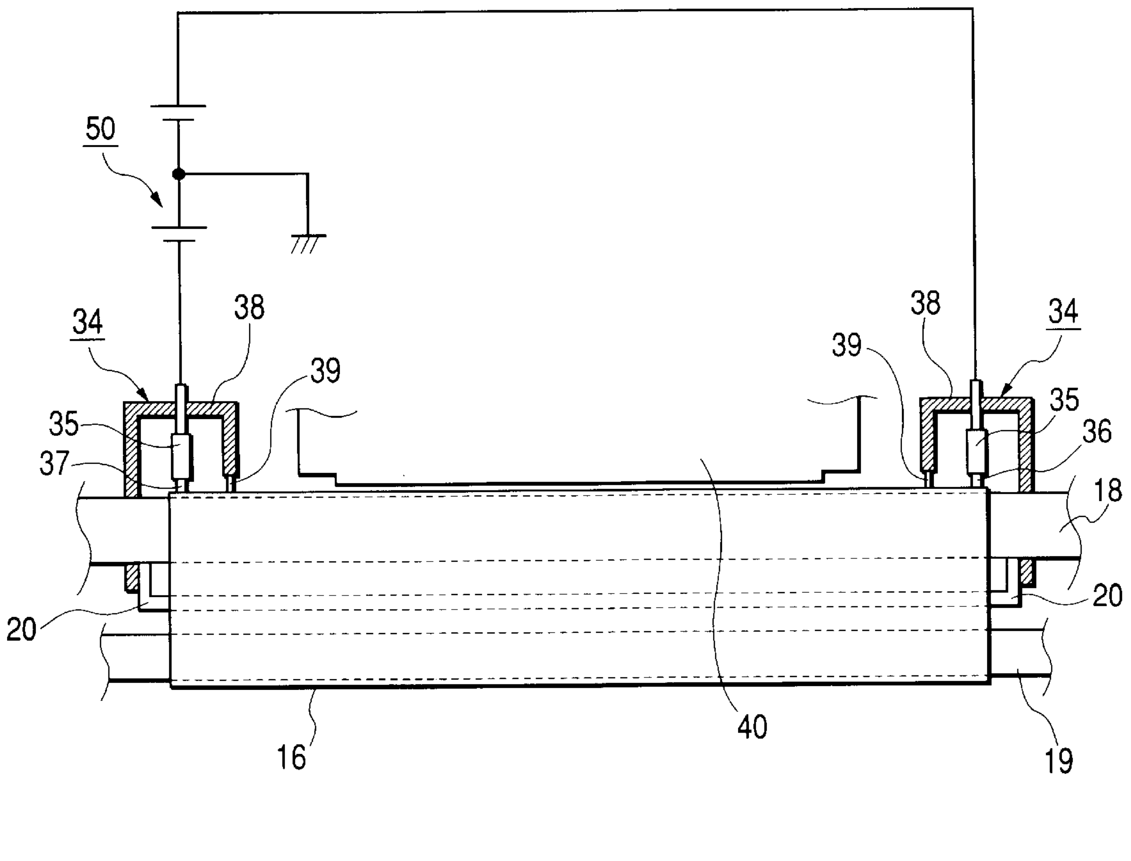
FIG. 5 is a schematic plan view of the conveyor belt, illustrating the supply of power to the conveyor belt.

As shown in FIG. 5, the power feeding brushes 36, 37 of the power feeding member 34 are supported by respective support members 35 and a cover 38 and a sealing member 39 are arranged to enclose each set of a support member 35 and a power feeding brush 36, 37. The cover 38 is fitted at the outside thereof to the platen 20 and provided at the entire inner edge thereof with a sealing member 39 made of low hardness elastomer so that it may held in contact with the conveyor belt 16 under a predetermined level of pressure. Due to the cover 38 and the sealing member 39, the power feeding member 34 is surrounded by a space of certain dimensions and isolated from the outside.

Figure 4:
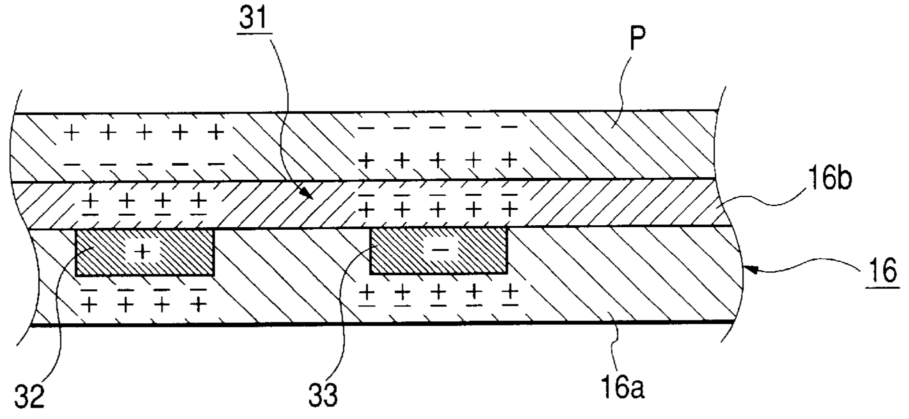
FIG. 4 is a schematic cross sectional view of part of the conveyor belt taken along line 4—4 in FIG. 3.

As shown in FIG. 4, the conveyor belt 16 protects the adsorptive power generating mechanism 31 comprising the electrode plates 32, 33 made of an electrically conductive material as they are sandwiched by the base layer 16*a* and the surface layer 16*b* thereof. Both the base layer 16*a* and the surface layer 16*b* are made of a synthetic resin such as polyethylene or polycarbonate.

As a voltage is applied to the electrode plates 32, 33, the surface layer 16*b* and the sheet of recording paper P are polarized as shown in FIG. 4 and the sheet of recording paper P is adsorbed to the adsorptive power generating mechanism 31 due to the electrostatic force generated there. More specifically, in the vicinity of the electrode plate 32 to which a positive voltage is applied, the side of the surface layer 16*b* located close to the electrode plate 32 is negatively charged and the surface of the surface layer 16*b* is positively charged. Similarly, the surface of the surface layer 16*b* is negatively charged in the vicinity of the electrode plate 33 to which a negative voltage is applied. Then, an electric field is generated by the potential difference so that the adsorptive power generating mechanism 31 adsorbs the sheet of recording paper P. Note that the surfaces of the sheet of recording paper P are also electrically charged according to the polarities of the electrode plates 32, 33.

Figure 6:
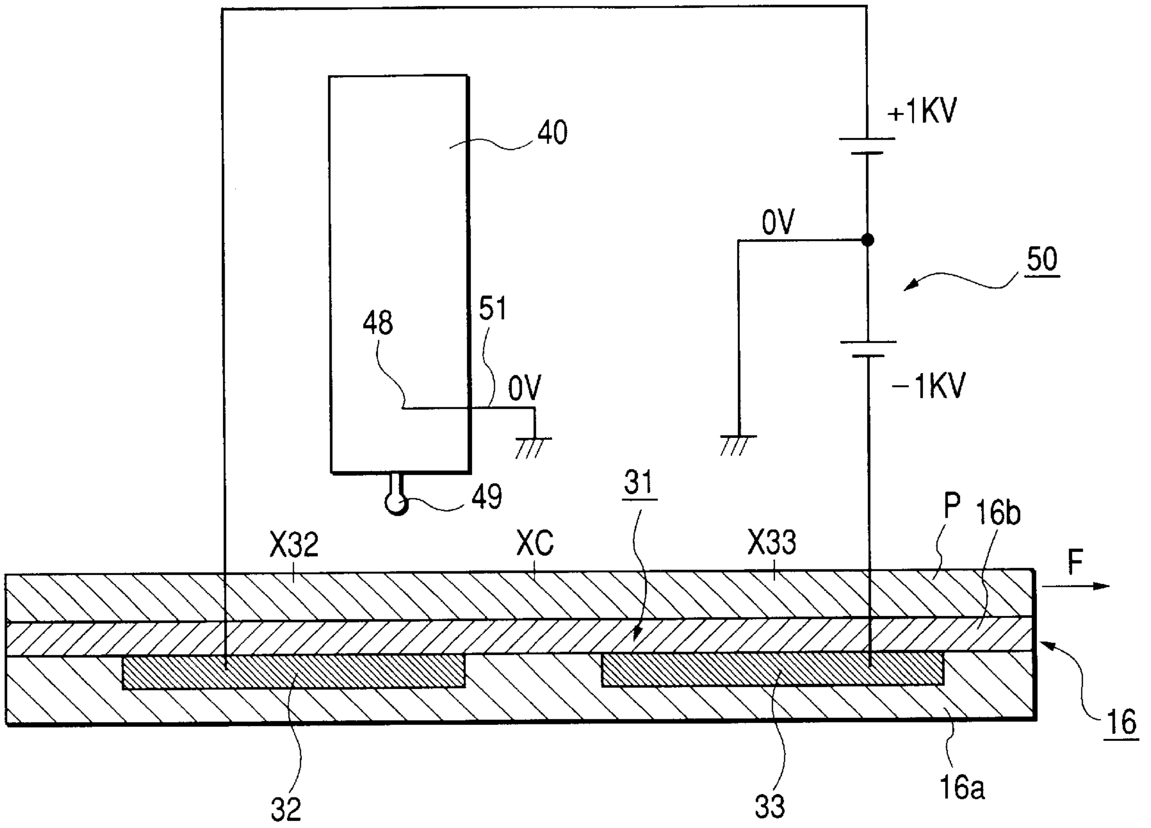
FIG. 6 is a schematic plan view of the conveyor belt, illustrating the adsorptive power generating mechanism.

As shown in FIG. 6, when the sheet of recording paper P is adsorbed to the adsorptive power generating mechanism 31, the positive/negative power source 50 is grounded by way of an earth terminal and +1 kV is applied to the electrode plate 32 by way of the power feeding brush 36, whereas −1 kV is applied to the electrode plate 33 by way of the power feeding brush 37.

Figure 7:
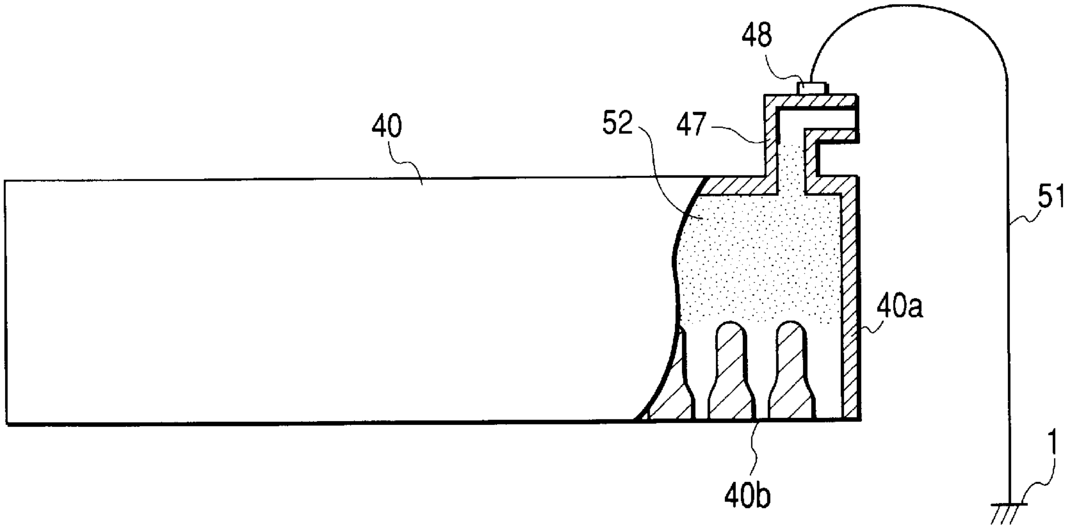
FIG. 7 is a schematic illustration of the grounding of the recording head of the embodiment of FIG. 1.

As shown in FIG. 7, the recording head 40 is grounded by way of an earth terminal 48. Referring to FIG. 7, the ink joint section 47 of the recording head 40 is made of stainless steel and provided with an earth terminal 48, which is grounded by way of a wire 51 and the frame of the recording apparatus 1 that is integral with the latter. Since ink 52 is aqueous, the orifice section 40*b* is also grounded and its potential is reduced to 0V. If the base 40*a* of the recording head 40 is made of metal, the base 40*a* may be directly grounded and the orifice section 40*b* may also be directly grounded without requiring the use of ink 52.

For a recording operation using the embodiment of recording apparatus having the above described configuration, the sheet of recording paper P is adsorbed to the conveyor belt 16 and moved in the direction indicated by arrow F in FIG. 6 as the conveyor belt 16 moves. Then, ink is ejected from the recording head 40 onto the sheet of recording paper P as the latter is being moved.

Figure 8:
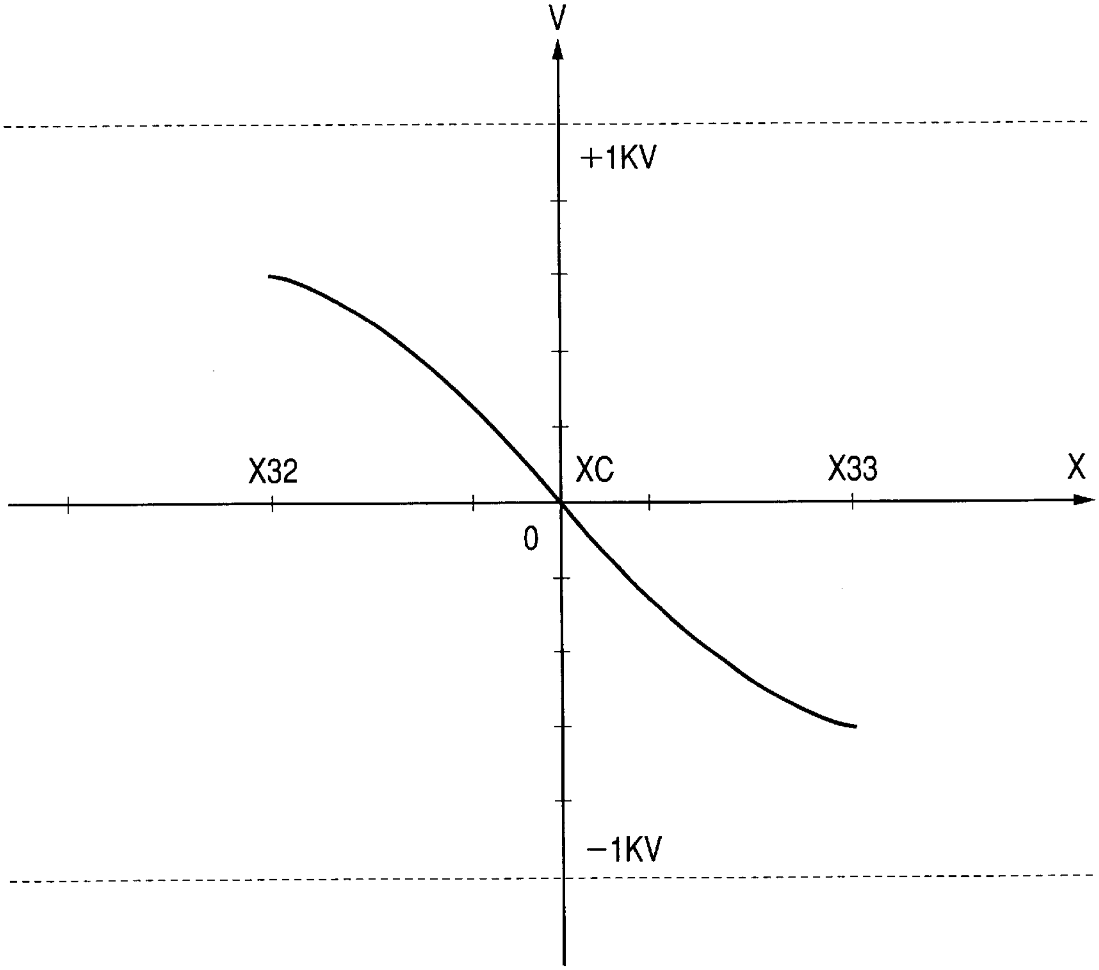
FIG. 8 is a graph illustrating the surface potential of the recording medium being moved by an adsorption conveyor belt.

FIG. 8 is a graph showing the electric potential of the surface of the sheet of recording paper P being moved obtained in an experiment. In FIG. 8, the horizontal axis represents the position of the sheet of recording paper P expressed in terms of the positions of the electrode plates 32, 33 of the conveyor belt 16 and the vertical axis represents the surface potential of the sheet of recording paper P relative to the potential of the (grounded) recording head 40.

As shown in FIG. 8, the graph of the surface potential of the sheet of recording paper P is symmetrical relative to a point corresponding to the middle point of the electrode plate 32 and the electrode plate 33. The largest positive potential appears at a position corresponding to the middle point X32 of the electrode plate 32, whereas the largest negative potential appears at a position corresponding to the middle point X33 of the electrode plate 33. As the sheet of recording paper P is moved in the direction of arrow F in FIG. 6, the surface potential of the area of the sheet of recording paper P located vis-a-vis the recording head 40 changes. The largest positive and negative potentials are equal to about ±0.6 kV respectively and appear with a certain time interval while the sheet of recording paper P is moving. However, these voltage values can change depending on the dimensions of the adsorptive power generating mechanism 31, the thickness and material of the base layer 16*a* and the surface layer 16*b*, and the humidity.

When the recording medium shows a relatively high surface potential, the droplets ejected from the recording head can be deflected from the proper course and ink mist can adhere to the surface of the recording medium so as to consequently adversely affect the image recorded on the surface.

Figure 9:
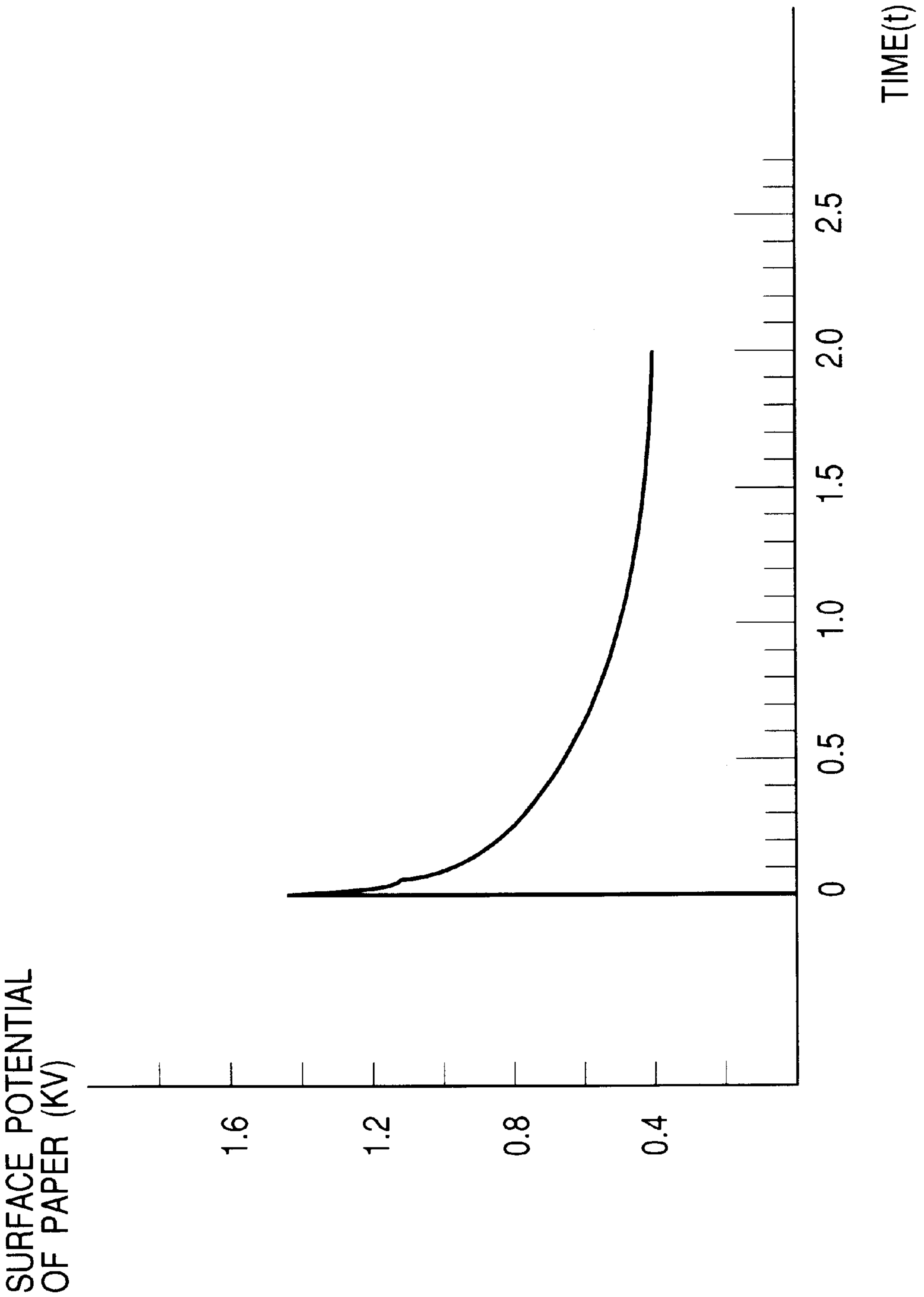
FIG. 9 is a graph illustrating the change with time of the surface potential of the recording medium of FIG. 8.

However, as a result of the studies by the inventors of the present invention, it has been found that the largest positive and negative potentials on the surface of the recording medium are reduced gradually from the potential levels substantially equal to those of the respective electrodes to the median value of the adjacently located electrodes, or 0V with time t. Note that the graph of FIG. 9 showing the result of an experiment is obtained by applying ±1.15 kV to the respective electrodes.

Also as a result of the studies by the inventors or the present invention, it has been found that the surface potentials of the recording medium are quickly reduced to 0 kV when the surface resistance of the recording medium is not greater than $1\times10^{11}$ Ω/□. The inventors of the present invention believe that this is because the electric charge produced on the surface of the sheet of recording paper P as described above by referring to FIG. 4 is neutralized quickly and disappears in a very short period of time when the surface resistance is found below the above identified level. On the other hand, the surface resistance of the recording medium is preferably not smaller than $1\times10^{8}$ Ω/□.

When the surface potential of the recording medium is reduced to 0 kV instantaneously, the influence of the surface potential on the ejected ink droplets and the ink mist produced by the ejection of ink is practically totally eliminated to prevent any problem from arising on the recorded image.

As a result, it is now possible to record an image by means of the ink-jet recording head while adsorbing the recording medium by the electrostatic adsorption system without any problem so that the distance separating the recording head and the recording medium is constantly and reliably maintained to a desired level and any adverse effect of surface electric charge of the recording medium that may otherwise be exerted on the ejected ink due to the electric field is prevented from taking place.

While the adsorptive power generating mechanism 31 is arranged in the inside of the conveyor belt 16 as integral part of the latter in the above described embodiment, the present invention is by no means limited thereto. Alternatively, electrode plates carrying electrodes on the surface may be rigidly arranged below an ordinary belt member that is used as conveyor belt. With such an arrangement, only the belt member may be driven to rotate and move a recording medium with it. While this arrangement may give rise to a problem of friction between the belt member and the adsorptive power generating mechanism, it provides an advantage of a simple configuration for the belt member.

Still alternatively, the belt member may be replaced by a drum member on which comb-shaped electrodes are arranged so that a recording medium may be adsorbed to and moved by the surface of the drum member. While this arrangement may make it difficult to downsize the entire apparatus, it provides an advantage of easily stabilizing the moving speed and the moving direction of the recording medium.

Now, an embodiment of recording medium showing a surface resistance not greater than $1\times10^{11}$ Ω/□ will be described below.

This embodiment of recording medium provides a number of advantages including that its surface shows the handle of plain paper which is normally used for ink-jet recording and absorbs the ink solvent excellently, that the recorded areas of the recording medium shows a high optical density and scarcely gives powder drop off, that the recording medium as a whole is less prone to become curled, highly water-resistant and well adapted to be moved and delivered by an electrostatic adsorption system, and that the image recorded thereon is scarcely damaged by the ink ejection operation of the recording head in addition to the advantages due to the surface resistance as pointed out above. These advantages will be discussed below.

The inventors of the present invention proposed recording mediums, each obtained by internally adding alumina hydrate to the fibrous material of the recording medium, in Japanese Patent Nos. 2714350 through 2714352 and Japanese Patent Application Laid-open Nos. 9-99627 and 2000-211250. Recording mediums disclosed in Japanese Patent Nos. 2714350 through 2714352 and Japanese Patent Application Laid-open No. 9-99627 are prepared by internally added alumina hydrate showing specific values for certain physical properties and the alumina hydrate is internally added to the entire fibrous material. According to these inventions, even non-coated paper provides a good coloring ability. Japanese Patent Application Laid-open No. 2000-211250 discloses a recording medium that is a multilayer paper medium comprising a surface layer and a base layer, of which only the surface layer contains internally added alumina hydrate. According to the invention of the patent document listed last, high speed printing can be realized with a high coloring ability and a high resolution by making only the surface layer contain internally added alumina hydrate and forming the base layer from a material that can effectively absorb liquid.

A recording medium according to the invention is realized by improving the recording mediums according to the above listed inventions. The inventors of the present invention has found that it is possible to obtain a recording medium that shows a good ink absorbability, an excellent coloring ability and a remarkable dot reproducibility and is well adapted to be moved and delivered by an electrostatic adsorption system without causing the image recorded thereon to be damaged by the ink ejection operation of the recording head by improving the above listed recording mediums containing internally adding alumina hydrate so as to make unsized paper, using a fibrous material containing no loading material, and cause the alumina hydrate to coexist with cationic resin and inorganic salt at least near the surface of the fibrous material, even if the recording medium has a single layer structure. A recording medium according to the invention is particularly effective when it is used with a high speed ink-jet recording apparatus comprising a full-line head. Preferably, said alumina hydrate, said cationic resin and said inorganic salt are applied to said unsized paper by on-machine coating. This embodiment of recording medium has a single layer structure and the alumina hydrate, the cationic resin and the inorganic salt are applied by on-machine coating so that it can be manufactured by an ordinary paper making machine without any problem to a great advantage of improving the productivity. It is also advantageous that the recording medium can be coated on both sides. For this embodiment of recording medium, the fibrous material is not limited to paper and synthetic paper using synthetic pulp, cloth, unwoven cloth or any other fibrous material may alternatively be used for it. For the purpose of the present invention, the term "unsized paper" refers to paper whose observed Stoeckgt sizing degree is 0 second. The Stoeckigt sizing degree can be observed by using the method defined by JIS P-8122.

Figure 10:
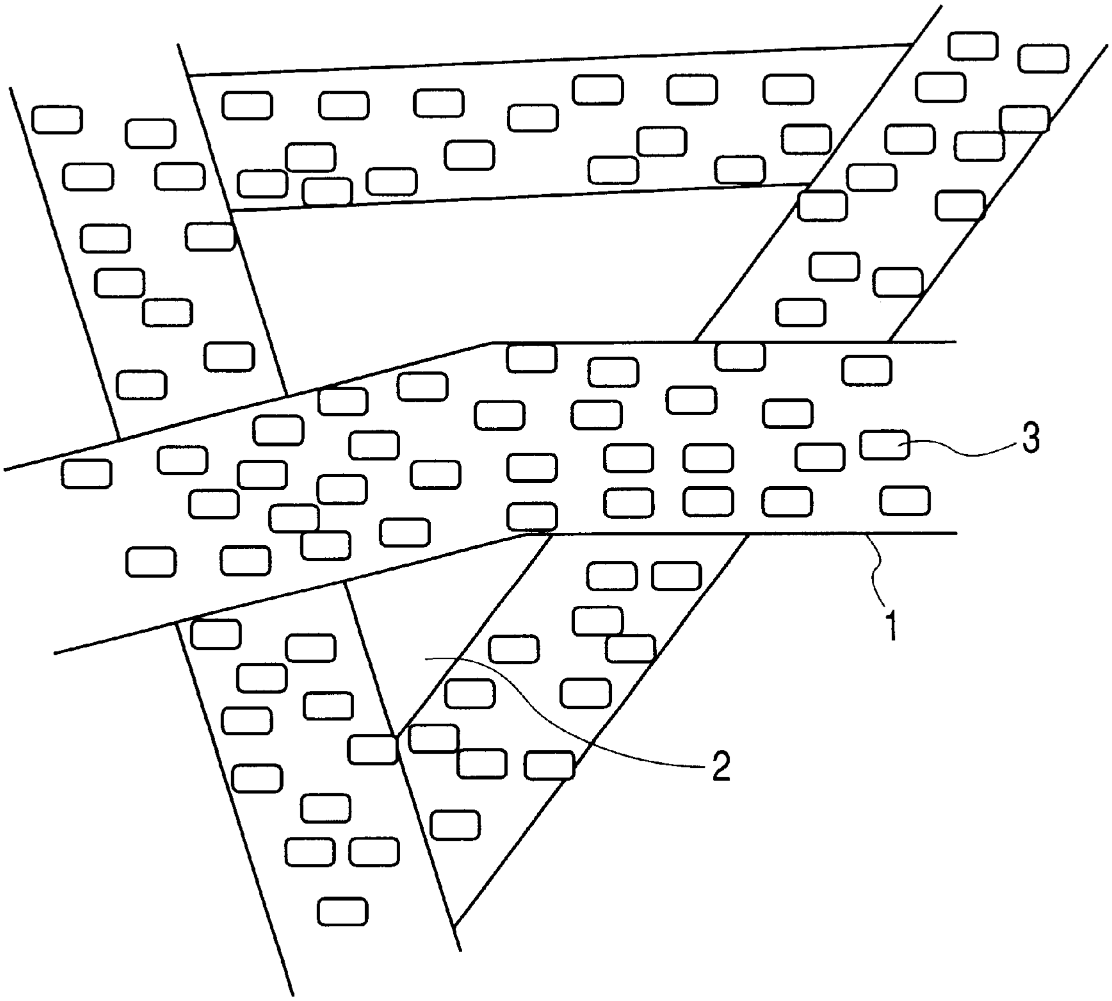
FIG. 10 is a schematic illustration of alumina or the like adhering to the fibers of an embodiment of recording medium according to the invention.

Thus, a recording medium according to the invention has a single layer structure mainly comprising fibers containing no loading material and is prepared by causing alumina hydrate to coexist with cationic resin and inorganic salt at least near the surface of the fibrous material. In a recording medium according to the invention, the coloring materials in the ink used for recording an image are adsorbed to the corresponding areas near the surface of ink receiving surface of the recording medium, while the solvent of the ink permeates into and is absorbed by an inner part of the recording medium. Preferably, alumina hydrate, cationic resin and inorganic salt may not be found in any of the gaps separating the fibers of the fibrous material. It is possible to ensure that no loading material is found in any of the gaps separating the fibers of the fibrous material by observing the surface of the recording medium through a scanning electronic microscope, using the method described in Japanese Patent Application Laid-open No. 6-312572, 7-25131 or 7-25132. The preferable magnification of the microscope is between 200 and 500. According to the invention, it is preferable to save the gaps separating the fibers of the fibrous material of the recording medium as many as possible in order to maximize the ink absorbing effect of the recording medium. Therefore, it is important that no loading material are found in any of the gaps separating the fibers of the fibrous material. Furthermore, according to the invention, the recording medium is not subjected to a surface size press operation that is normally used for plain paper and cloth in order to coat the surface with a resin material. In a recording medium according to the invention, alumina hydrate, cationic resin and inorganic salt are adhering to the surfaces of the fibers to cover the latter as shown in FIG. 10. However, it is desirable that alumina hydrate, cationic resin and inorganic salt do not fill the gaps separating the fibers of the fibrous material.

According to the invention, alumina hydrate, Acationic resin and inorganic salt are made to be found at least near the surface of the ink receiving surface of the single layer fibrous structure mainly made of a fibrous material. Alumina hydrate, cationic resin and inorganic salt may be added either by internally adding them to the recording medium base member having a single fibrous structure mainly made of a fibrous material or by coating or impregnating a predetermined surface area of the base member with these substances. However, preferably, a predetermined surface area of the base member is coated or impregnated with alumina hydrate, cationic resin and inorganic salt. The use of a process for coating a predetermined surface area of the base member with alumina hydrate, cationic resin and inorganic salt can make these substances exist near the surface of the recording medium to a large extent to improve the coloring ability of the ink applied to the recording medium. More preferably, alumina hydrate, cationic resin and inorganic salt are coated by means of an on-machine coating process. While the reason for this is not clear, the inventors of the present invention presume that the fibrous material of the recording medium is chemically and physically highly active during the on-machine coating process because the on-machine coating process starts immediately after making the paper and hence the alumina hydrate, cationic resin and inorganic salt that are brought to contact the fibrous material are made to be highly active or because the alumina hydrate, cationic resin and inorganic salt that are applied to the fibrous material shortly adhere to the latter so that the coating solution can easily permeate into the center of the base member.

When the recording medium is prepared in the form of sheets, each of the surfaces there of is coated with alumina hydrate, cationic resin and inorganic salt preferably at a rate of 1 to 5 $g/m^2$. In the case of on-machine coating, the opposite surfaces of each sheet are coated simultaneously. Then, the two surfaces are coated with alumina hydrate, cationic resin and inorganic salt preferably at a combined rate of 2 to 10 $g/m^2$. When the coating substances are used within the above cited range, the gaps separating the fibers of the fibrous material can be secured reliably. The recording medium can be made to show the handle of plain paper and provide a good coloring ability with a low coating rate when an on-machine coating process is used.

For the purpose of the present invention, the expression of the “handle” of plain paper refers to a condition where some of the fibers of the fibrous material are exposed to the surface and, when touched by hand, the surface does not give out any feeling of coated fine particles. For the purpose of the present invention, the expression of “on-machine coating” refers to an operation of coating the surface of the fibrous material continuously with a coating solution containing alumina hydrate, cationic resin and inorganic salt on an on-machine basis in the paper making process in place of applying a resin material such as starch onto the surface of the fibrous material as in an ordinary paper making process. On-machine coating is described in detail, inter alia, in Japanese Patent Application Laid-open Nos. 1-141783 and 11-174718. In other words, no size press layer exists on the surface of a recording medium according to the invention.

Japanese Patent Application Laid-open Laid-Open No. 1-141783 discloses ink-jet recording paper that is obtained by coating a support member with a coating solution containing amorphous silica and alumina hydrate showing an average particle size of 5 to 200 nm at a ratio between 100:5 and 100:35 by weight in an on-machine coating process. According to the above cited invention, alumina sol is used as binder for amorphous silica to be used for the coating in order to improve the productivity of on-machine coating, using a paper making machine. While this embodiment of recording medium and the ink-jet recording paper disclosed in the above patent document commonly use an on-machine coating process, the paper disclosed in the patent document differs from this embodiment that is produced by coating unsized paper containing no loading material with a coating solution containing alumina hydrate, cationic resin and inorganic salt.

Japanese Patent Application Laid-Open No. 11-174718 discloses information recording paper that is pigment-sized on each surface at a rate of 3 to 8 $g/m^2$ to show a finished density within a range between 0.75 and 0.90 $g/cm^2$, a fiber orientation ratio within a range between 1.05 and 1.25, a smoothness within a range between 50 and 120 seconds and a formation index not less than 20. According to the above cited patent document, information recording paper is subjected to a coating operation, using a pigment size, in order to prevent toner from entering any of the gaps in the paper when the density of the paper is lowered to reduce the basis weight, while maintaining the rigidity and the image quality of the full color image formed on it by a full color copying machine. While this embodiment of recording medium and the information recording paper disclosed in the above patent document commonly subjected to a coating operation in a specific area, using a pigment size, the above patent document does not describe the basic concept of on-machine coating paper prepared without adding any loading material and having satisfactory properties including ink absorbability, coloring ability and the handle of plain paper with alumina hydrate, cationic resin and inorganic salt according to the invention.

Alumina hydrate is electrically positively charged and hence the coloring materials such as dyes contained in ink can be fixed to a satisfactory extent. Additionally, it is effective for producing an image showing a good coloring ability and does not give rise to the problem of black ink turning brown or that of light-resistance. Therefore, it is a substance that can advantageously be used for ink-jet recording medium.

Alumina hydrate to be used in this embodiment of recording medium according to the invention preferably shows a boemite structure when examined by X-ray diffractometry because such alumina hydrate operates excellently for improving the ink absorbability, the coloring material adsorbability and the coloring ability of the recording medium.

Alumina hydrate is defined by the general formula shown below;

$$Al_2O_{3-n}(OH)_{2n}\cdot mH_2O,$$

where n represents an integer between 0 and 3 and m represents a value between 0 and 10, preferably between 0 and 5. The expression of $mH_2O$ indicates a detachable aqueous phase that does not participate in the formation of crystal lattice in many cases. Therefore, m can take a non-integer value. Note, however, that both m and n are not equal to zero at the same time.

Crystal of alumina hydrate generally showing a boehmite structure is a layered compound whose (020) plane is a huge plane and that shows a specific diffraction peak in the X-ray diffraction graph. The boehmite structure may be a perfect boehmite structure or a so-called pseudo-boehmite structure that contains excessive water between the (020) planes. Alumina hydrate having a pseudo-boehmite structure shows a broader diffraction peak than alumina hydrate having a perfect boehmite structure. However, since the perfect boehmite structure and the pseudo-boehmite structure cannot be clearly discriminated, alumina hydrate to be used in this embodiment may have either of the structures (and is referred to simply as alumina hydrate hereinafter).

Alumina hydrate having a boehmite structure to be used in this embodiment preferably shows a boemite structure when examined by X-ray diffractometry because such alumina hydrate operates excellently for improving the color density and the resolution of the image formed on the recording medium and the ink absorbability of the recording medium. For the purpose of the invention, alumina hydrate may contain one or more than one metal compounds such as titanium dioxide and/or silica so long as it has a boehmite structure.

Alumina hydrate to be used for this embodiment may be prepared by any manufacturing method so long as it can manufacture alumina hydrate having a boehmite structure. Alumina hydrate manufacturing methods that can be used for the purpose of the invention include hydrolysis of aluminum alkoxide and hydrolysis of sodium aluminate that are well known in the art. Additionally, as disclosed in Japanese Patent Application Laid-open No. 56-120508, alumina hydrate that is amorphous when examined by X-ray diffractometry can be made to show a boehmite structure by means of a heat treatment conducted at temperature not lower than 50° C. in the presence of water.

Unsized paper cellulose pulp to be used for this embodiment is not subjected to any limitations. For instance, materials that can be used for unsized paper cellulose pulp include chemical pulp such as sulfite pulp (SP) obtained from timbers of broad leaf trees and needle leaf trees, alkali pulp (AP) and kraft pulp (KP) and used paper pulp that is de-inked secondary fiber such as semi-chemical pulp, semi-mechanical pulp and mechanical pulp. Any pulp may be used without discriminating unbleached pulp and bleached pulp and beaten pulp and unbeaten pulp. Cellulose pulp that can be used for the purpose of the invention include non-wood pulp obtained from fibers of grasses, leaves, bast and seed hair as well as straws, bamboos, flax, bagasse, kenaf, mitsumata and cotton linter. For the purpose of the present invention, it is necessary that the recording medium does not contain any loading material. It is also necessary that it does not contain any water absorbing resin such as polyvinyl alcohol and polyacrylamide. The recording medium provides a good dot-reproducibility when it does not contain any loading material nor water-absorbing resin.

The basis weight of the recording medium is not subjected to any limitations if it is not too small and the recording medium is extremely thin. However, it is preferably within a range between 40 and 300 $g/m^2$ from the viewpoint of convenience of moving it while being printed by a printer. More preferably, the basis weight is within a range between 45 and 200 $g/m^2$ because the recording medium becomes highly opaque without unduly raising the bending strength when the basis weight is found within the above range. Additionally, when a large number of printed sheets are stacked, they would hardly stick to one another if the basis weight is found within the above range.

Preferably, finely fibrillated cellulose, crystallized cellulose, sulfate pulp and sulfite pulp obtained from broad leaf trees and/or needle leaf trees, soda pulp, hemicellulase-treated pulp and enzyme-treated chemical pulp are added to the cellulose pulp of this embodiment of recording medium. The surface smoothness and the formation of the recording medium are improved and the surface of the recording medium is made free from tucks and swollen deformations that may otherwise be produced immediately after a printing operation when any of these pulps are added.

Bulky cellulose fibers, mercerized cellulose, fluffed cellulose, thermo-mechanical pulp and other mechanical pulp may be added to the cellulose pulp of this embodiment. The ink absorbing rate and the ink absorbing capacity of the recording medium can be improved by adding any of these pulps.

The ink absorbing rate of this embodiment of recording medium can be measured by means of a known scanning liquid absorption dynamometer. The embodiment of recording medium preferably absorbs liquid at a rate not smaller than 50 $ml/m^2$ when held in contact with liquid for 25 milliseconds. When the liquid absorption rate is higher than the above identified value, the embodiment can prevent beading from taking place regardless of the ink composition. More preferably, the embodiment of recording medium absorbs liquid at a rate not smaller than 100 $ml/m^2$ when held in contact with liquid for 100 milliseconds. When the liquid absorption rate is higher than the above identified value, the embodiment can effectively prevent feathering, crawling and beading from taking place in the case of high speed multiplex printing.

The liquid absorbing rate and the liquid absorbing capacity of the embodiment of recording medium can be controlled to respective target values by selecting an appropriate type of cellulose pulp and an appropriate level of beating. The liquid absorbability of the embodiment of recording medium can be improved by adding bulky cellulose, mercerized cellulose, fluffed cellulose and mechanical pulp. Additionally, the surface smoothness of the embodiment of recording medium can be improved by adding fibrillated cellulose, crystallized cellulose, sulfate pulp, sulfite pulp, soda pulp, hemicellulase-treated pulp and enzyme-treated chemical pulp.

Any popular paper manufacturing method may be used for manufacturing the embodiment of recording medium. A conventional paper machine such as a fourdrinier paper machine, a cylinder paper machine or a twin wire paper machine may be use for manufacturing the embodiment of recording medium.

The process of manufacturing the embodiment of recording medium does not involve a size press step of ordinary paper manufacturing processes where typically a starch coating operation is conducted. Instead, an on-machine coating step, using alumina hydrate, cationic resin and inorganic salt, is employed. Any known appropriate coating method may be used for the on-machine coating step. For example, any known coating technique using a gate roll coater, a size press, a bar coater, a blade coater, an air knife coater, a roll coater, a brush coater, a curtain coater, a gravure coater or a spray device may be employed for the purpose of the invention. Alumina hydrate and cationic resin may be mixed or used independently for on-machine coating.

The surface of the embodiment of recording medium may be smoothed by means of a calender or a super calender.

While alumina hydrate having a boehmite structure is used for the embodiment of recording medium, alumina hydrate containing one or more than one metal compounds such as titanium dioxide and/or silica may alternatively be used if it shows a boehmite structure when observed by X-ray diffractometry. Alumina hydrate containing titanium dioxide as disclosed in Japanese Patent No. 2714351 may be used as alumina hydrate having a boehmite structure. Alumina hydrate containing silica as disclosed in Japanese Patent Application Laid-open No. 2000-79755 may be used as alumina hydrate having a boehmite structure. Still alternatively, alumina hydrate containing one or more than one oxides and/or compounds of magnesium, calcium, strontium, barium, zinc, boron, silicon, germanium, tin, lead, zirconium, indium, phosphor, vanadium, niobium, tantalum, chromium, molybdenum, tungsten, manganese, iron, cobalt, nickel and ruthenium may be used for the purpose of the invention instead of titanium dioxide or silica.

The form of alumina hydrate (particle profile, particle size, aspect ratio) can be determined by preparing an observation specimen by dispersing alumina hydrate into deionized water and dropping it onto collodion film and subsequently observing the specimen through a transmission type electron microscope. It is known that, of alumina hydrate, pseudo-boehmite may take a ciliary shape or some other shape as described in Rocek J., et al., Applied Catalysis, Vol. 74, pp. 29–36, 1991. Alumina hydrate having either a ciliary shape or a platy shape may be used for the embodiment.

If alumina hydrate having a platy shape is used, the aspect ratio of plate-shaped particles can be determined by means of a method defined in Japanese Patent Publication No. 5-16015. The aspect ratio is the ratio of the diameter to the thickness of a particle. The term of diameter as used herein refers to that of a circle having an area equal to the projected area of the particle of alumina hydrate that is observed through a microscope or an electron microscope. On the other hand, the slenderness ratio refers to the ratio of the smallest diameter to the largest diameter of the projected figure as observed through a microscope or an electron microscope. In the case of an agglomerate of fine particles like a hair bundle (to be referred to simply as hair bundle hereinafter), each needle-shaped particle of alumina hydrate forming the hair bundle is regarded as a column so that the diameter of the top circle, that of the bottom circle and the height of the column are measured and the ratio of the diameter to the length is calculated to determine the aspect ratio. For the purpose of the present invention, the most preferable shape of alumina hydrate is that of a plate with an average aspect ratio within a range between 3 and 10 and an average particle diameter within a range between 1 and 50 nm or that of a hair bundle with an average aspect ratio within a range between 3 and 10 and an average particle length within a range between 1 and 50 nm. When the average aspect ratio is found within the above cite range, gaps are formed to separate particles so that a porous structure showing a broad pore radius distribution can be produced with ease at the time of forming the ink receiving layer or that of internally adding alumina hydrate to the fibrous material. When the average particle diameter or the average length is found with the above cited range, it is easy to produce a porous structure with a large pore volume.

The BET specific surface area of alumina hydrate to be used for the embodiment of recording medium is preferably within a range between 70 and 300 $m^2/g$. If the BET specific surface area is below the above cited range, the printed image can turn grey and the water-resistance of the formed image can be unsatisfactory. If the BET specific surface area is above the cited range, a phenomenon of powder drop-off can easily occur. The BET specific surface area, the pore radius distribution and the pore volume can be determined by a nitrogen adsorption/desorption method.

The crystal structure of alumina hydrate in a recording medium can be observed by ordinary X-ray diffractometry. The recording medium containing internally added alumina hydrate is fitted to a measurement cell and the peak of the (020) plane that appears when the diffraction angle $2\theta$ is between 14 and 15° are observed. Then, interplanar spacing of the (020) plane and the crystalline size in a direction perpendicular to the (010) plane are determined from the diffraction angle $2\theta$ and the half-width B by using the Bragg's formula and the Scherrer's formula respectively.

The interplanar spacing of the (020) plane of alumina hydrate in the embodiment of recording medium is preferably greater than 0.167 nm but not greater than 0.620 nm. When it is found within the above cited range, a wide choice of coloring materials such as dyes becomes available and the optical density of the printed area is raised regardless if the selected coloring material is hydrophilic or hydrophobic. a Additionally, the appearance of feathering, beading and crawling is minimized. Furthermore, a uniform optical density and a uniform dot diameter can be achieved for the printed dots if a hydrophilic coloring material and a hydrophobic coloring material are used in combination. The optical density and the dot diameter of the printed area do not fluctuate and the appearance of feathering, beading and crawling is minimized if ink contains a hydrophilic or hydrophobic substance. The crystalline size in a direction perpendicular to the (010) plane is preferably within a range between 6.0 and 10.0 nm. Both the absorbability of ink and the adsorbability of coloring material are improved and the phenomenon of powder drop-off is minimized within the above cited range. For instance, the interplanar spacing of the (020) plane and the crystalline size in a direction perpendicular to the (010) plane can be confined to the respective ranges by using a method disclosed in Japanese Patent Application Laid-Open-No. 9-99627.

The degree of crystallinity of alumina hydrate in a recording medium can also be determined by X-ray diffractometry. The recording medium containing internally added alumina hydrate is crushed to powder to prepare a specimen and the specimen is fitted to a measurement cell. Then, the intensity when the diffraction angle $2\theta$ is 10° and the peak of the (020) plane that appears when the diffraction angle $2\theta$ is between 14 and 15° are observed. The degree of crystallinity is determined from the intensity of the peak of the (020) plane relative to the intensity of the peak for $2\theta=0°$. The degree of crystallinity of alumina hydrate in the recording medium is preferably within a range between 15 and 80. Both the ink absorbability of the recording medium and the water-resistance of the image printed on the recording medium are improved when the degree of crystallinity is found within the above cited range. For instance, the degree of crystallinity of alumina hydrate in a recording medium can be confined to the above range by using a method disclosed in Japanese Patent Application Laid-Open No. 8-132731.

There are three preferable pore structures of alumina hydrate that can be used for the purpose of the invention. One or more than one of them can be used appropriately.

The first pore structure that can be used for the purpose of the invention has an average pore radius of alumina hydrate particles found within a range between 2.0 and 20.0 nm and a half-width of pore radius distribution found within a range between 2.0 and 15.0 nm. The average pore radius is defined in Japanese Patent Application Laid-open Nos. 51-38298 and 4-202011. The half-width of pore radius distribution refers to the width of a half of the frequency of appearance of measured values for the average pore radius obtained from the pore radius distribution.

When the average pore radius and the half-width are found within the above cited ranges respectively, a wide choice of coloring materials such as dyes becomes available and the appearance of feathering, beading and crawling is minimized. Furthermore, a uniform optical density and a uniform dot diameter can be achieved. Alumina hydrate having the above described pore structure can be prepared by using a method disclosed in Japanese Patent No. 2714352.

The second pore structure that can be used for the purpose of the invention shows maximum values in the pore radius distribution of alumina hydrate particles in a range not greater than 10.0 nm and in a range between 10.0 and 20.0 nm respectively. Pores with a relatively large radius between 10.0 and 20.0 nm absorb the ink solvent, while pores with a relatively small radius not greater than 10.0 nm adsorb coloring materials mainly those contained in ink. Thus, the above described pore structure can absorb the ink solvent and adsorb coloring materials at an accelerated rate. The maximum value in a range not greater than 10.0 nm is preferably found within a range between 1.0 and 6.0 nm because coloring materials are adsorbed quickly when the maximum value is found in that range. The specific pore volume of the maximum part of the pore radius distribution in the range not greater than 10.0 nm (maximum part 2) is preferably between 0.1 and 10% , more preferably between 1 and 5%, of the entire pore volume in order to raise both the ink absorption rate the coloring material adsorption rate. Alumina hydrate having the above described pore structure can be prepared by using a method disclosed in Japanese Patent No. 2714350. Alternatively, such alumina hydrate can be prepared by combining alumina hydrate showing a peak at the radius of 10.0 nm and alumina hydrate showing a peak at the radius between 10.0 and 20.0.

The third pore structure that can be used for the purpose of the invention shows the highest peak in the pore radius distribution of alumina hydrate particles within a range of radius between 2.0 and 20.0 nm. Then, the above described pore structure can absorb the ink solvent and adsorb coloring materials at an accelerated rate, make the alumina hydrate highly transparent and prevent the printed image from becoming grey. More preferably, the largest value in the pore radius distribution is found within a range between 6.0 and 20.0 nm. Then, the appearance of feathering, crawling and color unevenness is minimized regardless if pigment ink, dye ink, a combination of pigment ink and dye ink or mixture ink is used for printing. Most preferably, the largest value in the pore radius distribution is found within a range between 6.0 and 16.0 nm. Then, if three or more than three types of ink that are different in terms of density of coloring material are used, no difference of tint due to the difference of density can be noticed. Alumina hydrate having the above described pore structure can be prepared by using a method disclosed in Japanese Patent Application No. 9-6664.

The total pore volume of alumina hydrate is preferably within a range between 0.4 and 1.0 $cm^3/g$. When the total pore volume is found within the above range, the embodiment of recording medium shows a high ink absorbability and does not damage the tint of the printed image if the image is printed in a number of colors. More preferably, the total pore volume of alumina hydrate is preferably within a range between 0.4 and 0.6 $cm^3/g$ in order to prevent the phenomenon of powder drop-off and that of feathering of image from occurring. Furthermore, the printed image is free from graying when the pores of alumina hydrate particles with a radius within a range between 2.0 and 20.0 nm take more than 80% of the total pore volume. Alternatively, alumina hydrate may be agglomerated for use. It is preferable that the particle radius is between 0.5 and 50 $\mu$m and the ratio of the BET specific surface area to the pore volume is found within a range between 50 and 500 $m^2$/ml. Then, beading can be prevented from taking place regardless of the printing environment (temperature, humidity) because many adsorption sites of alumina particles are exposed. Agglomerate particles having such a pore structure can be prepared by using a method disclosed in Japanese Patent Application Laid-open No. 8-174993.

It is also possible to use alumina hydrate that is treated by a coupling agent for the embodiment of recording medium. One or more than one coupling agents selected from those of the silane type, the titanate type, the aluminum type and the zirconium type may be used. When alumina hydrate is made hydrophobic by the coupling agent, it is possible to print a clear image showing a high color density. The coloring ability can be improved without damaging the ink absorbability when the alumina hydrate is treated by a coupling agent to a percentage range between 0.1 and 30% in terms of surface area. The above treatment using a coupling agent can be conducted by using a method described in Japanese Patent Application Laid-open No. 9-76628.

Metal alkoxides and substances that can crosslink hydroxyl groups may be added to alumina hydrate for the embodiment of recording medium. Any popular metal alkoxide such as tetraethoxysilane or tetramethoxysilane may be selected and used for the purpose of the invention. A substance that can crosslink hydroxyl groups may be selected from boric acid, boric acid compounds and formalin compounds. These substances may be added by using a method described in Japanese Patent Application Laid-Open No. 9-86035. Feathering and beading can be prevented from occurring by adding these substances when ink obtained by adding a surfactant to a large extent to improve its penetrability is used for printing.

Cationic resin to be used for the embodiment of recording medium can be selected from quaternary ammonium salts, polyamines, alkylamines, halogenated quaternary ammonium salts, cationic urethane resin, benzalkonium chloride, benzethonium chloride, dimethyldiallylammonium chloride polymers.

A water-soluble cerium compound is particularly preferable as inorganic salt to be used for the embodiment of recording medium.

Any water-soluble cerium compound may be used for the purpose of the invention so long as it is useful for achieving the object of the present invention. When aqueous ink is used for printing an image on the embodiment of recording medium and as ink droplets gets to the recording medium, the water-soluble cerium compound contained in the embodiment is dissolved and mixed with the ink droplets. Then, the substance produced as a result of the dissolution of water-soluble cerium compound acts on the pigment coloring materials in the ink droplets, the water-soluble polymer and the emulsion existing in ink and/or the micro-encapsulated coloring materials to fix the latter on the recording medium. The rate at which the coloring materials and other substances are fixed to the recording medium by the action of a water-soluble cerium compound is very high and hence can be adapted to high speed printers and printers provided with a full-line head that have become available recently. Such a high fixing rate provides a high resolution for letters and other fine lines and an additional advantage of preventing uneven solid print areas from taking place. These advantages of a high fixing rate are not achievable by the known technique of adding cationic resin and one or more than one metal salts and particularly conspicuous when full color pigment ink is used for the printer. When letters are printed on a solid print area of any conventional recording medium, the contours of the letters printed on the solid print area are not clear. To the contrary, when letters are printed on a solid print area of a recording medium according to the invention, the contours of the letters printed on the solid print area are as clear as those of the letters printed on a white background. Furthermore, images such as sea waves and skin colors whose color tone and density change delicately can be copied with a high degree of fidelity.

Preferably, cerium halogenide such as cerium chloride is used as water-soluble cerium compound for the purpose of the present invention. Cerium halogenide is quickly dissolved and dispersed into ink during a printing operation and effectively prevents the recording medium from becoming sticky and colored when the recording medium is in storage. More preferably, crude rare earth chloride is used as water-soluble cerium compound. Crude rare earth chloride is obtained as residue of a process of extracting rare earth elements from the mineral resource containing rare earth elements that is dug out from a mine, and it still contains rare earth elements as a primary component. Since crude rare earth chloride is a natural product, it shows a low oral toxicity and hence is safe and can be obtained at low cost. Additionally, it can improve the optical stability of the image printed by dye ink.

A water-soluble cerium compound may be added to the recording medium without limitations. However, the rate at which it is added in order to improve the coloring ability is preferably selected from a range between 0.01 and 10.0 $g/m^2$. More preferably, a water-soluble cerium compound is added to the recording medium at a rate selected from a range between 0.1 and 7.0 $g/m^2$ in order to realize a uniform density of solid print areas and prevent feathering of narrow lines.

Ink for forming an image on the embodiment of recording medium mainly contains a coloring agent (dye or pigment), a water-soluble organic solvent and water. If a dye is used, it is preferably a water-soluble dye selected from a direct dye, an acid dye, a basic dye, a reactive dye and a food dye so long as it can meet the requirements including fixability, coloring ability, clearness, stability and light-resistance for providing a good image when combined with the recording medium. If a pigment is used, on the other hand, carbon black is preferably used. The pigment may be combined with a dispersant or micro-encapsulated. Alternatively, a self-dispersing type pigment may be used.

The water-soluble dye is dissolved into water or a solvent comprising water and water-soluble solvent. The solvent is preferable a mixture of water and any of various water-soluble organic solvents. The water content of ink is preferably so regulated that it is found within a range between 20 and 90% by weight.

Water-soluble organic solvents that can be used for the purpose of the invention include alkyl alcohols with 1 to 4 carbon atoms such as methyl alcohol, amides such as dimethylformamide, ketones and ketone alcohols such as acetone, ethers such as tetrahydrofuran, polyalkylene glycols such as polyethylene glycol, alkylene glycols whose alkylene group has 2 to 6 carbon atoms such as ethylene glycol, glycerol, lower alkyl ethers of polyhydric alcohols such as ethylene glycol methyl ether. Of these water-soluble organic solvents, polyhydric alcohols such as diethylene glycol, lower alkyl ethers of polyhydric alcohols such as triethylene glycol monomethyl ether, triethylene glycol monoethyl ether are preferable. The use of polyhydric alcohol is particularly preferable because it is effective as lubricant for preventing water in ink from evaporating to deposit the water-soluble dye, which by turn clogs the nozzles.

A solubilizing agent may be added to ink. Typical solubilizing agents that can be used for the purpose of the invention include nitrogen-containing heterocyclic ketones. When added, such a solubilizing agent can dramatically improve the solubility of the water-soluble dye into the solvent. For example, N-methyl-2-pyrrolidone or 1,3-dimethyl-2-imidazolidinone may preferably be used. Furthermore, a viscosity regulator, a surfactant, a surface tension regulator, a pH regulator and/or a specific resistance regulator may be added in order to improve the performance of the embodiment.

An ink-jet recording method is used for forming an image on the embodiment of recording medium by applying ink. Any method may be used for the purpose of the invention so long as it is adapted to effectively release ink from the nozzles of the printing head and apply the ink to the recording medium. The ink-jet recording method disclosed in Japanese Patent Application Laid-open No. 54-59936 that causes an abrupt change in the volume of ink by thermal energy and eject ink from the nozzles of the ink-jet recording head under the effect of the change in the state of ink can be effectively used for the purpose of the invention.

EXAMPLES

Now, the present invention will be described further by way of specific examples.

(Recording Performance)

The specimens of recording media used in the following examples were evaluated for performance on the items listed below.

The specimens were subjected to a printing operation, using a high speed printer comprising a full line type ink-jet recording head as described earlier particularly by referring to FIG. 1. The resolution of the head was 600 DPI and two 8 pl ink droplets were made to strike each 600 DPI pixel in all of the ink colors and form an image.

1) Ink Absorbability

A solid print area was formed by printing in one to four colors by means of the above described printer. Immediately after the printing operation, the ink absorbability was tested by touching the ink on the surface of the recording medium to examine the dried condition of the ink. The amount of ink used for the recording in a single color was assumed to be 100%. Then, the specimen where ink was not put to the finger at the amount of ink of 300% (mixture of three colors) was rated as ◎ and the specimen where ink was not put the finger at the amount of ink of 200% (mixture of two colors) was rated as ○, whereas the specimen where ink was not put to the finger at the amount of ink of 100% was rated as Δ and the specimen where ink was put to the finger also at the amount of ink of 100% was rated as ×.

2) Image Density

The image densities of the solidly print images printed by means of the above printer with an amount of ink of 100% in single color of Y, M, C and Bk inks were evaluated by means of a Macbeth reflection densitometer.

3) Solid Print Evenness, Feathering, Beading, Crawling, Strike-Through

For each specimen, a 10 mm×10 mm solid print square pattern was printed in single color or multi-color by means of the above printer was visually examined for solid print evenness, feathering, beading and crawling. As for solid print evenness, a specimen carrying the solid print pattern was rated as ○ when it was even and uniform but rated as × when it showed one more than one blank areas and/or streaky unevenness. As for feathering, a specimen was rated as ○ when it showed no feathering of the coloring material (s) but rated as × when it showed feathering of the coloring material (s). Similarly, as for beading and crawling, a specimen was rated as ○ when it showed no beading and crawling but rated as × when it showed beading and crawling. Each specimen was visually examined for strike-through and rated as ○ when no strike-through was observed but rated as × when strike-through was observed.

4) Curling After Recording

A 50 mm×50 mm solid print square pattern was printed in single color with an amount of ink of 100% at the center of each specimen by means of the above printer. The extent of warping was observed by placing the specimen on a flat table. A specimen was rated as ○ when the warping was less than 1 mm, Δ when the warping was less than 3 mm and × when the warping was not less than 3 mm.

5) Tackiness After Recording

A 10 mm×10 mm solid print square pattern was printed in single color with an amount of ink of 100% on each specimen by means of the above printer. A specimen was rated as ○ when the surface of the recording medium was touched by a finger tip and ink did not stick to the finger tip but rated as × when ink stuck to the finger tip.

6) Powder Drop-Off After Recording

Ten sheets of specimens were stacked together and moved together by means of the above printer and each of the ten specimens was visually observed for powder drop-off. A specimen was rated as ○ when no powder drop-off was observed but rated as × when powder drop-off was observed.

7) Adhesion after Recording

A 50 mm×50 mm solid print square pattern was printed in single color with an amount of ink of 100% at the center of each specimen by means of the above printer. Ten sheets of specimens were printed continuously and stacked together. A specimen was rated as ○ when it showed no adherence but rated as × when it showed adherence to another specimen.

8) Surface Changes After Recording

A 50 mm×50 mm solid print square pattern was printed in single color with an amount of ink of 100% at the center of each specimen by means of the above printer. The surface of each specimen of recording medium was visually observed immediately after the printing. A specimen was rated as ○ when it showed no change on the recording surface but rated as × when it showed changes such as swelling, wrinkling, deforming and/or cockling on the recording surface.

9) Surface Resistance of Recording Medium

The surface resistance of each specimen was measured by a surface resistance meter in an environment of 25° C. and 50%RH.

10) Striking Accuracy of Ink Droplets

Ink droplets were ejected from adjacent nozzles simultaneously. A rating of × was given when the ideal targets were missed by more than 10 $\mu$m and a rating of ◎ was given when the ideal targets was missed by less than 3 $\mu$m. A rating of ○ was given for in-betweens.

11) Adhesion of Ink Mist to Recording Medium

A solid image that could easily produce ink mist was printed on each specimen and the specimen was visually observed to see if the ink mist adhering to areas surrounding the solid image was visible or not. A rating of × or Δ was given when the ink mist was visible or slightly visible and a rating of ○ was given when the ink mist was not visible.

(ink)

Aqueous ink having the composition shown below was used for the examples. black (Bk) ink

| | |
|---|---|
| pigment dispersing solution | 25 portions |
| food black 2 | 2 portions |
| glycerol | 6 portions |
| triethylene glycol | 5 portions |
| Acetylenol EH | 0.1 portions |
| (available from Kawaken Fine Chemical) | |
| water | balance |

The above pigment dispersing solution was prepared in a manner as described below.

(Pigment Dispersing Solution)

1.58 g of anthranilic acid was added at 5° C. to a solution obtained by dissolving 5 g of concentrated hydrochloric acid into 5.3 g of water. The solution was held to lower than 10° C. by stirring it in an ice bath and a solution obtained by dissolving 1.78 g of anthrium nitrite into 8.7 g of water at 5° C. The produced solution was stirred for 15 minutes and 20 g of carbon black showing a surface area of 320 $m^2$/g and a DBP oil absorption rate of 120 ml/100 g was added in a mixed state. Subsequently, the mixture was stirred for 15 minutes and the obtained slurry was filtered through filter paper (Toyo Roshi No.2, manufactured by Advantis). The resultant filter cake (pigment particles) was washed and then dried in an oven at 110° C. Thereafter, water was added to the obtained pigment to prepare an aqueous pigment solution with a pigment concentration of 10 wt %. In this way, the pigment dispersing solution was prepared. It contained self-dispersing type carbon black to the surface of which hydrophilic groups were bonded by way of phenyl groups and the surface of which was anionically charged.

| | |
|---|---|
| (yellow (Y) ink) | |
| C. I. Direct Yellow 86 | 3 portions |
| glycerol | 5 portions |
| diethylene glycol | 5 portions |
| Acetylenol EH | 1 portion |
| (available from Kawaken Fine Chemical) | |
| water | balance |
| (magenta (M) ink) | |
| C. I. Acid Red 289 | 3 portions |
| glycerol | 5 portions |
| diethylene glycol | 5 portions |
| Acetylenol EH | 1 portion |
| (available from Kawaken Fine Chemical) | |
| water | balance |
| (cyan (C) ink) | |
| C. I. Direct Blue 199 | 3 portions |
| glycerol | 5 portions |
| diethyleneglycol | 5 portions |
| Acetylenol EH | 1 portion |
| (available from Kawaken Fine Chemical) | |
| water | balance |

(Recording Medium of Example 1)

Commercially available LBKP was used as raw pulp and beaten by means of a double disk refiner to obtain beaten raw material (A) of Canadian Standard Freeness (C. S. F) 300 ml. Similarly, commercially available LBKP was beaten by the same apparatus to obtain beaten raw material (B) of Canadian Standard Freeness (C. S. F) 450 ml. The beaten raw material (A) and the beaten raw material (B) were mixed to a ratio of 9:1 as reduced to dry weight to prepare the material for paper making.

An alumina hydrate dispersing solution with a solid concentration of 10 wt % was prepared by dispersing alumina hydrate having a boehmite structure as described in Example 1 of Japanese Patent Application Laid-open No. 9-99627 into deionized water. A cationic resin dispersing solution containing the effective ingredient by 10 wt % was prepared by mixing Weistex H-90 (tradename, available from Nagase Kasei Kogyo, effective ingredient: 45%) as cationic resin with deionized water. The alumina hydrate dispersing solution and the cationic resin dispersing solution were mixed to a ratio of 1:1 to prepare a mixed coating solution.

Commercially available crude rare earth chloride was dispersed into deionized water to prepare a water dispersing solution with a solid concentration of 3 wt %.

Paper having a basis weight of 80 g/$m^2$ was produced by means of a fourdrinier paper machine, using the above paper making raw material. Then, the paper was coated with the mixed coating solution containing the alumina hydrate and the cationic resin by means of a 2-roll size press machine at a rate of 4 g/$m^2$ (alumina hydrate 2 g/$m^2$, cationic resin 2 g/$m^2$) per side as reduced to dry weight and subsequently coated with the crude rare earth chloride dispersing solution by means of the second stage size press machine at a rate of 0.2 g/$m^2$ per side as reduced to dry weight. Finally, the surfaces were smoothed by means of a super calender to prepare the finished recording medium.

(Recording Medium of Example 2)

The recording medium of Example 2 was prepared as in Example 1 except that the specimen was coated with the crude rare earth chloride dispersing solution by means of the second stage size press machine at a rate of 0.5 g/$m^2$ per side as reduced to dry weight.

(Recording Medium of Example 3)

The recording medium of Example 3 was prepared as in Example 1 except that the specimen was coated with the crude rare earth chloride dispersing solution by means of the second stage size press machine at a rate of 0.8 $g/m^2$ per side as reduced to dry weight.

(Recording Medium of Reference Example)

The recording medium of this example was prepared as in Example 1 except that it was not coated with any crude rare earth chloride dispersing solution.

The specimens of the examples were evaluated to obtain the results listed in Table 1 below.

As seen from the table, a recording medium whose surface resistance is not greater than $1\times10^{11}$ Ω/□ meets the various requirements for satisfactory performances. As a result, the problems relating to the transfer by an electrostatic adsorption belt as identified earlier are dissolved to make it possible to realize high quality printing.

Additionally, the present invention provides the following advantages.

(1) Since images can be printed on a recording medium according to the invention by means of an ink-jet recording head while it is being adsorbed by an electrostatic adsorption system, the distance between the ink-jet recording head and the recording medium can be stably held to a constant level and the electric field produced by the surface electric charge of the recording medium does not adversely affect the ink droplets to realize high quality printing.

In terms of the recording medium, (2) A good ink absorbability is obtained without adhesion and ink transfer when a high speed printing machine provided with a full line head is used.

(3) A high coloring ability and a good dot reproducibility are obtained without producing any strike-through because the droplets of coloring materials ejected toward the recording medium are quickly isolated on the surface of the recording medium in a high speed printing operation.

(4) A recording medium according to the invention can be manufactured in a simple manner to raise the productivity because it has a single layer structure.

(5) A recording medium according to the invention can be manufactured in a simple manner by means of an ordinary paper machine because it is coated with alumina hydrate, cationic resin and inorganic salt on an on-machine basis.

Particularly, due to the effect of the inorganic salt, the surface resistance of the recording medium can be held to less than a certain level to maximize the advantage of (1) above. Additionally, since the surface resistance of either surface is controlled in the manufacturing process because of the on-machine coating, the recording medium can be separated easily from the electrostatic conveyor belt.

While the above embodiments and the above examples were described in terms of the use of electrostatic adsorption and a conveyor belt, the present invention is by no means limited thereto. An arrangement of stably and rigidly holding a recording medium simply by electrostatic adsorption and conducting a printing operation by moving the recording head relative to the recording medium is also within the scope of the present invention.

As described above, the surface resistance of a recording medium according to the invention is held to a level not greater than $1\times10^{11}$ Ω/□ so that, when the recording medium is moved by electrostatic adsorption, the surface potential of the recording medium that is produced by electrostatic adsorption as a result of being moved by means of an electrostatic adsorption system is quickly reduced to 0V. Therefore, the problem of the electric field that is generated by the surface potential to deflect the ejected ink droplets and that of ink mist that can adhere to the recording medium can be effectively prevented from occurring.

Consequently, an ink-jet recording apparatus according to the invention and adapted to adsorb and move the recording medium by means of an electrostatic adsorption system can minimize the influence of the surface potential of the recording medium on the recorded image and at the same time meet the requirements relating to the recording performance and also a recording medium that can suitably be used with such an ink-jet recording apparatus.

TABLE 1

| | Recording Medium of | | | |
|---|---|---|---|---|
| | Example 1 | Example 2 | Example 3 | Reference Example |
| ink absorbability | ◎ | ◎ | ◎ | ◎ |
| image density | | | | |
| (Y) | 1.15 | 1.14 | 1.14 | 1.14 |
| (M) | 1.15 | 1.14 | 1.13 | 1.15 |
| (C) | 1.15 | 1.14 | 1.14 | 1.15 |
| (Bk) | 1.50 | 1.51 | 1.52 | 1.30 |
| uniformity of solid printed area | ○ | ○ | ○ | ○ |
| feathering | ○ | ○ | ○ | ○ |
| beading | ○ | ○ | ○ | ○ |
| crawling | ○ | ○ | ○ | ○ |
| strike-through | ○ | ○ | ○ | ○ |
| curling after printing | ○ | ○ | ○ | ○ |
| tackiness after printing | ○ | ○ | ○ | ○ |
| powder drop-off after printing | ○ | ○ | ○ | ○ |
| adhesion after printing | ○ | ○ | ○ | ○ |
| surface change after printing | ○ | ○ | ○ | ○ |
| surface resistance (Ω/□) | $2 \times 10^{10}$ | $1 \times 10^{10}$ | $6 \times 10^{9}$ | $3 \times 10^{11}$ |
| striking accuracy of ink droplets | ◎ | ◎ | ◎ | ○ |
| adhesion of ink mist to recording medium | ○ | ○ | ○ | Δ |

What is claimed is:

1. A recording medium to be used for an ink-jet recording apparatus adapted to eject ink from an ink-jet head onto the recording medium held in position by means of an electrostatic adsorption system;

the surface resistance of said recording medium being not greater than $1\times10^{11}$ Ω/□, wherein said recording medium has a single layer structure mainly made of a fibrous material not containing any loading material, the recording medium containing no sizing agent, and alumina hydrate having boehmite structure, cationic resin and inorganic salt exist near the surface of said fibrous material.

2. A recording medium according to claim 1, wherein gaps exist among fibers of said fibrous material of said recording medium and none of pigment, loading material and resin exist in the gaps except near the surface of the fibers of the fibrous material.

3. A recording medium according to claim 1, wherein said alumina hydrate, said cationic resin and said inorganic salt exist on the surface of each fiber of the fibrous material.

4. A recording medium according to claim 1, wherein said alumina hydrate, said cationic resin and said inorganic salt exist only near the front surface and the rear surface of the recording medium.

5. A recording medium according to any of claims 1 through 4, wherein each of said alumina hydrate and said cationic resin is applied to the vicinity of the front surface and the rear surface at a rate of 1 to 5 $g/m^2$ per side.

6. A recording medium according to any of claims 1 through 4, wherein said fibrous material contains at least one substance selected from finely fibrillated cellulose, sulfate pulp obtained from broad leaf trees and/or needle leaf trees, sulfite pulp, soda pulp, hemicellulase-treated pulp and enzyme-treated chemical pulp.

* * * * *

UNITED STATES PATENT AND TRADEMARK OFFICE

CERTIFICATE OF CORRECTION

PATENT NO. : 6,716,495 B1
APPLICATION NO. : 09/987298
DATED : April 6, 2004
INVENTOR(S) : Hitoshi Yoshino et al.

It is certified that error appears in the above-identified patent and that said Letters Patent is hereby corrected as shown below:

ON THE COVER PAGE:
At (56) References Cited, FOREIGN PATENT DOCUMENTS (page 2)
"8-174993" should read --8-174993 A--.

COLUMN 6:
Line 27, "the.adsorptive" should read --the adsorptive--.
Line 41, "then" should read --than--.
Line 59, "may" should read --may be--.

COLUMN 9:
Line 38, "has" should read --have--.

COLUMN 10:
Line 1, "Stoeckgt" should read --Stöckigt--.
Line 2, "Stoeckigt" should read --Stöckigt--.
Line 28, "are" should read --is--.
Line 39, "Acationic" should read --cationic--.

COLUMN 12:
Line 15, "boemite" should read --boehmite--.
Line 45, "boemite" should read --boehmite--.

COLUMN 15:
Line 49, "hydrophobic.a" should read --hydrophobic.--.
Line 67, "Laid-Open-No." should read --Laid-open No.--.

COLUMN 16:
Line 10, "2θ=0°." should read --2θ=10°.--
Line 59, "rate the" should read --rate and the--.

COLUMN 18:
Line 14, "gets" should read --get--.

COLUMN 19:
Line 15, "preferable" should read --preferably--.

COLUMN 20:
Line 14, "put" should read --put to--.

UNITED STATES PATENT AND TRADEMARK OFFICE

CERTIFICATE OF CORRECTION

PATENT NO. : 6,716,495 B1
APPLICATION NO. : 09/987298
DATED : April 6, 2004
INVENTOR(S) : Hitoshi Yoshino et al.

It is certified that error appears in the above-identified patent and that said Letters Patent is hereby corrected as shown below:

COLUMN 21:

Line 23, "was" should read --were--.

Line 34, "black (Bk) ink" should be deleted.

Lines 37-39, "

| | |
|---|---|
| pigment dispersing solution | 25 portions |
| food black 2 | 2 portions |

"

should read --

(black (Bk) ink)

| | |
|---|---|
| pigment dispersing solution | 25 portions |
| food black 2 | 2 portions |

--.

COLUMN 22:

Line 19, "diethyleneglycol" should read --diethylene glycol--.

Line 27, "(C. S. F)" should read --(C.S.F.)--.

Line 30, "(C. S. F)" should read --(C.S.F.)--.

COLUMN 24:

Table 1, Lines 20-25

"

| | Example 1 | Example 2 | Example 3 | Reference Example |
|---|---|---|---|---|
| ink absorbability | ⊚ | ⊚ | ⊚ | ⊚ |
| image density | | | | |
| (Y) | 1.15 | 1.14 | 1.14 | 1.14 |
| (M) | 1.15 | 1.14 | 1.13 | 1.15 |

"

UNITED STATES PATENT AND TRADEMARK OFFICE

CERTIFICATE OF CORRECTION

PATENT NO. : 6,716,495 B1
APPLICATION NO. : 09/987298
DATED : April 6, 2004
INVENTOR(S) : Hitoshi Yoshino et al.

It is certified that error appears in the above-identified patent and that said Letters Patent is hereby corrected as shown below:

COLUMN 24:
Table 1, Lines 20-25
should read
--

| | Example 1 | Example 2 | Example 3 | Reference Example |
|---|---|---|---|---|
| ink absorbability | ⊚ | ⊚ | ⊚ | ⊚ |
| image density | | | | |
| (Y) | 1.15 | 1.14 | 1.14 | 1.14 |
| (M) | 1.15 | 1.14 | 1.13 | 1.15 |

--.

Signed and Sealed this

Second Day of October, 2007

JON W. DUDAS
*Director of the United States Patent and Trademark Office*